(12) United States Patent
Imai et al.

(10) Patent No.: US 10,528,064 B2
(45) Date of Patent: Jan. 7, 2020

(54) TUBE PUMP SYSTEM AND METHOD FOR CONTROLLING THE TUBE PUMP SYSTEM

(71) Applicant: Surpass Industry Co., Ltd., Saitama (JP)

(72) Inventors: Yukinobu Imai, Saitama (JP); Kazuki Hirai, Saitama (JP)

(73) Assignee: Surpass Industry Co., Ltd., Saitama (JP)

(*) Notice: Subject to any disclaimer, the term of this patent is extended or adjusted under 35 U.S.C. 154(b) by 272 days.

(21) Appl. No.: 15/702,789

(22) Filed: Sep. 13, 2017

(65) Prior Publication Data
US 2018/0074525 A1    Mar. 15, 2018

(30) Foreign Application Priority Data
Sep. 14, 2016 (JP) .................... 2016-179549

(51) Int. Cl.
*F04B 43/12* (2006.01)
*G05D 7/06* (2006.01)
(Continued)

(52) U.S. Cl.
CPC ........ *G05D 7/0623* (2013.01); *F04B 11/0091* (2013.01); *F04B 43/09* (2013.01);
(Continued)

(58) Field of Classification Search
CPC ...... F04B 43/09; F04B 43/12; F04B 43/1253; F04B 43/1269; F04B 49/005; F04B 49/06;
(Continued)

(56) References Cited

U.S. PATENT DOCUMENTS 3,649,138 A     3/1972  Clay et al.
3,726,613 A *   4/1973  von Casimir ....... F04B 11/0075
                                                 417/477.1
(Continued)

FOREIGN PATENT DOCUMENTS

DE      20109803 U1    10/2002
JP      2000-205201 A   7/2000
JP      2008308994 A   12/2008

OTHER PUBLICATIONS

Extended European Search Report (EESR) dated Nov. 27, 2017 for European Patent Application No. 17190606.8.
(Continued)

*Primary Examiner* — Charles G Freay
*Assistant Examiner* — Thomas Fink
(74) *Attorney, Agent, or Firm* — Muncy, Geissler, Olds & Lowe, P.C.

(57) ABSTRACT

There is provided a tube pump system including: a pair of roller units rotated around an axis line from a contact position to a separate position; a pair of drive units rotating the pair of roller units respectively; and a control unit controlling each of the pair of drive units. A pipe having flexibility is connected to an outflow-side end portion of the tube, and the pipe maintains a pressure of a liquid flowing through the inside of the pipe at a first predetermined pressure higher than an atmospheric pressure. The control unit controls each of the pair of drive units such that a pressure of the liquid in the tube closed due to a contact of the pair of roller units is increased to a second predetermined pressure when one of the pair of roller units passes the separate position.

8 Claims, 18 Drawing Sheets

(51) Int. Cl.
*F04B 11/00* (2006.01)
*F04B 43/09* (2006.01)
*F04B 49/22* (2006.01)
*F04B 51/00* (2006.01)

(52) U.S. Cl.
CPC .......... *F04B 43/12* (2013.01); *F04B 43/1253* (2013.01); *F04B 49/22* (2013.01); *F04B 51/00* (2013.01)

(58) Field of Classification Search
CPC ...... F04B 49/065; F04B 49/20; F04B 45/065; F04B 45/067; F04B 45/08; F04B 2205/03–05; F04B 2205/13; F04B 2201/02011; F04B 2201/021; A61M 5/14232; A61M 1/1039
See application file for complete search history.

(56) References Cited

U.S. PATENT DOCUMENTS

| | | | | |
|---|---|---|---|---|
| 3,826,593 A * | 7/1974 | von Casimir | ....... | F04B 11/0075 417/53 |
| 3,938,909 A | 2/1976 | Willock | | |
| 5,640,181 A * | 6/1997 | Uchida | ................ | B41J 2/16523 347/24 |
| 7,645,127 B2 * | 1/2010 | Hagen | .................. | F04B 43/1253 417/477.1 |
| 2005/0019185 A1 | 1/2005 | Otis, Jr. | | |
| 2006/0245964 A1 | 11/2006 | Koslov | | |
| 2013/0072871 A1 * | 3/2013 | Ozturk | .............. | A61M 5/14232 604/123 |
| 2013/0280104 A1 * | 10/2013 | Heide | ..................... | F04B 43/12 417/53 |
| 2015/0159642 A1 * | 6/2015 | Sasa | ..................... | F04B 43/1238 137/544 |
| 2015/0240802 A1 * | 8/2015 | Guthrie | ............... | F04B 43/1238 417/44.1 |
| 2015/0330385 A1 * | 11/2015 | Lofstrom | ................. | F04B 43/12 417/53 |
| 2016/0245271 A1 * | 8/2016 | Schaefer | ............ | A61M 1/1603 |
| 2017/0051735 A1 * | 2/2017 | Gaskill-Fox | ........ | F04B 43/1261 |
| 2017/0096995 A1 * | 4/2017 | Imai | .................. | F04B 43/1253 |
| 2018/0128266 A1 * | 5/2018 | Gaskill-Fox | ............ | F04B 49/20 |
| 2018/0230987 A1 * | 8/2018 | Imai | ..................... | F04B 43/082 |
| 2019/0136853 A1 * | 5/2019 | Bach | ..................... | F04B 49/06 |

OTHER PUBLICATIONS

Extended European Search report dated Jul. 15, 2019 in related application 19162820.5.

* cited by examiner

TUBE PUMP SYSTEM AND METHOD FOR CONTROLLING THE TUBE PUMP SYSTEM

CROSS-REFERENCE TO RELATED APPLICATIONS

This application is based on Japanese Patent Application No. 2016-179549, the contents of which are incorporated herein by reference in its entirety.

TECHNICAL FIELD

The present disclosure relates to a tube pump system and a method for controlling the tube pump system.

BACKGROUND ART

Conventionally, a tube pump has been known where a tube having flexibility is intermittently compressed by a plurality of rollers so as to supply a liquid in the tube under pressure. The tube pump intermittently supplies the liquid under pressure and hence, pulsation (an operation where an increase and a decrease in flow rate is repeated) is generated in the liquid supplied under pressure.

As a device that suppresses pulsation generated in a liquid supplied by a pump under pressure, a damper has been known where a gas chamber and a liquid chamber are formed in the inside of the damper, and a pressure balance between the gas chamber and the liquid chamber is kept thus suppressing pulsation of the liquid introduced into the liquid chamber (see Japanese Unexamined Patent Application, Publication No. 2000-205201 (hereinafter referred to as "JP 2000-205201"), for example).

SUMMARY

Technical Problem

With the provision of the damper disclosed in JP 2000-205201 in a path on the downstream side of a tube pump, pulsation of a liquid can be suppressed.

However, the damper disclosed in JP 2000-205201 has a structure including the liquid chamber that stores a fixed amount of liquid and hence, the damper has a space where a liquid which does not flow into the liquid chamber is kept (so-called dead volume). Therefore, various bacteria or the like are generated in the liquid stagnating in the space and hence, there is a possibility that the purity of the liquid is not properly maintained. Further, the damper disclosed in JP 2000-205201 has the gas chamber and the liquid chamber so that a relatively complicated structure and a relatively large volume are required. Accordingly, the device is complicated and large-sized as a whole.

The inventors have found the following. That is, when a tube of a tube pump which is compressed by a roller returns to the original shape, a phenomenon occurs where a liquid is drawn back toward the tube pump side from a path on the downstream side of the tube pump, and pulsation is generated due to such a phenomenon. With the suppression or elimination of the phenomenon, pulsation of the liquid can be further suppressed.

The present disclosure has been made in view of such circumstances, and an object thereof is to provide a tube pump system where pulsation of a liquid can be suppressed or eliminated without making an apparatus complicated and large-sized, and a method for controlling the tube pump system.

Solution to Problem

To solve the above-described problem, a tube pump according to the present disclosure employs the following solutions.

According to one aspect of the present disclosure, there is provided a tube pump system which includes: a housing unit which has an inner peripheral surface formed into a circular-arc shape around an axis line; a tube having flexibility which is arranged along the inner peripheral surface; a pair of roller units which are housed in the housing unit, and are rotated around the axis line from a contact position to a separate position around the axis line in a state where the pair of roller units compress the tube; a pair of drive units which are configured to rotate the pair of roller units respectively around the axis line in a same direction; and a control unit which is configured to control each of the pair of drive units such that a liquid which flows into the tube from one end of the tube is discharged from the other end of the tube, wherein a pipe having flexibility is connected to the other end of the tube, the pipe maintaining a pressure of the liquid flowing through the inside of the pipe at a first predetermined pressure higher than an atmospheric pressure, and the control unit is configured to control each of the pair of drive units such that a pressure of the liquid in the tube which is closed due to a contact of the pair of roller units is increased to a second predetermined pressure having a predetermined pressure difference with respect to the first predetermined pressure when one of the pair of roller units passes the separate position.

In the tube pump system according to one aspect of the present disclosure, the pair of roller units are rotated around the axis line in the same direction by the pair of drive units respectively so that the pair of roller units reaches the separate position from the contact position in a state where the pair of roller units compress the tube. The control unit controls each of the pair of drive units so as to make a liquid which flows into the tube from one end of the tube discharge from the other end of the tube. The pipe having flexibility is connected to the other end of the tube, and a pressure of the liquid flowing through the inside of the pipe is maintained at the first predetermined pressure higher than the atmospheric pressure. A static pressure in the inside of the pipe is higher than the atmospheric pressure and hence, when the static pressure of the liquid in the pipe is further increased by pulsation of the liquid, the pipe is elastically deformed whereby transmission of pulsation of the liquid to the downstream side can be suppressed.

In the tube pump system according to one aspect of the present disclosure, when one of the pair of roller units passes the separate position, a pressure of the liquid in the tube which is closed due to the contact of the pair of roller units is increased to the second predetermined pressure having a predetermined pressure difference with respect to the first predetermined pressure. Therefore, when one of the pair of roller units passes the separate position and the tube compressed by the roller unit returns to the original shape, a pressure difference between a pressure of the liquid on the downstream side of the separate position and a pressure of the liquid on the upstream side of the separate position is reduced thus conforming to a predetermined pressure difference. Accordingly, compared to a case where the pressure difference is larger than the predetermined pressure difference, it is possible to suppress the generation of pulsation of a liquid caused by the fluctuation of the flow rate of the liquid at the separate position when one of the pair of roller units passes the separate position.

In the tube pump system according to one aspect of the present disclosure, the control unit may be configured to temporarily increase an angular velocity of one of the pair of roller units when the state where one of the pair of roller units compresses the tube is released.

With such a configuration, when the state where one of the pair of roller units compresses the tube is released, one of the pair of roller units can temporarily increase a discharge force for discharging a liquid toward the downstream side of the separate position. Therefore, it is possible to suppress the generation of pulsation of the liquid which is caused by a high pressure liquid on the downstream side of the separate position drawn back toward a low pressure fluid on the upstream side of the separate position.

In the tube pump system according to one aspect of the present disclosure, the tube pump system may further include a flowmeter which is configured to measure a flow rate of the liquid flowing through the inside of the pipe, and the control unit may be configured to control each of the pair of drive units such that the flow rate of the liquid measured by the flowmeter conforms to a target flow rate.

With such a configuration, it is possible to control each of the pair of drive units such that the flow rate of the liquid measured by the flowmeter conforms to the target flow rate while the generation of pulsation of the liquid is suppressed.

In the tube pump system according to one aspect of the present disclosure, the first predetermined pressure may be equal to or more than 30 kPaG and equal to or less than 150 kPaG.

With such a configuration, the first predetermined pressure of the liquid flowing through the pipe becomes sufficiently higher than the atmospheric pressure and hence, further transmission of pulsation of the liquid to the downstream side of the pipe can be suppressed.

In a method for controlling a tube pump system according to another aspect of the present disclosure, there is provided a method for controlling a tube pump system which includes: a housing unit which has an inner peripheral surface formed into a circular-arc shape around an axis line; a tube having flexibility which is arranged along the inner peripheral surface; a pair of roller units which are housed in the housing unit, and are rotated around the axis line from a contact position to a separate position around the axis line in a state where the pair of roller units compress the tube; and a pair of drive units which are configured to rotate the pair of roller units respectively around the axis line in a same direction, the method including a controlling step of controlling each of the pair of drive units such that a liquid which flows into the tube from one end of the tube is discharged from the other end of the tube, wherein a pipe having flexibility is connected to the other end of the tube, the pipe maintaining a pressure of the liquid flowing through the inside of the pipe at a first predetermined pressure higher than an atmospheric pressure and, in the controlling step, each of the pair of drive units is controlled such that a pressure of the liquid in the tube which is closed due to a contact of the pair of roller units is increased to a second predetermined pressure having a predetermined pressure difference with respect to the first predetermined pressure when one of the pair of roller units passes the separate position.

In the method for controlling a tube pump system according to another aspect of the present disclosure, with the control of each of the pair of drive units, it is possible to make a liquid which flows into the tube from one end of the tube discharge from the other end of the tube. The pipe having flexibility is connected to the other end of the tube, and a pressure of the liquid flowing through the inside of the pipe is maintained at the first predetermined pressure higher than the atmospheric pressure. A static pressure in the inside of the pipe is higher than the atmospheric pressure and hence, when the static pressure of the liquid in the pipe is further increased by pulsation of the liquid, the pipe is elastically deformed whereby transmission of pulsation of the liquid to the downstream side can be suppressed.

In the method for controlling a tube pump system according to another aspect of the present disclosure, when one of the pair of roller units passes the separate position, a pressure of the liquid in the tube which is closed due to the contact of the pair of roller units is increased to the second predetermined pressure having a predetermined pressure difference with respect to the first predetermined pressure. Therefore, when one of the pair of roller units passes the separate position and the tube compressed by the roller unit returns to the original shape, a pressure difference between a pressure of the liquid on the downstream side of the separate position and a pressure of the liquid on the upstream side of the separate position is reduced thus conforming to a predetermined pressure difference. Accordingly, compared to a case where the pressure difference is larger than the predetermined pressure difference, it is possible to suppress the generation of pulsation of a liquid caused by the fluctuation of the flow rate of the liquid at the separate position when one of the pair of roller units passes the separate position.

In the method for controlling a tube pump system according to another aspect of the present disclosure, in the controlling step, an angular velocity of one of the pair of roller units may be temporarily increased when a state where one of the pair of roller units compresses the tube is released.

With such a configuration, when the state where one of the pair of roller units compresses the tube is released, one of the pair of roller units can temporarily increase a discharge force for discharging a liquid toward the downstream side of the separate position. Therefore, it is possible to suppress the generation of pulsation of the liquid which is caused by a high pressure liquid on the downstream side of the separate position drawn back toward a low pressure fluid on the upstream side of the separate position.

In the method for controlling a tube pump system according to another aspect of the present disclosure, the method may further include a measuring step of measuring a flow rate of the liquid flowing through the inside of the pipe and, in the controlling step, each of the pair of drive units may be controlled such that the flow rate of the liquid measured in the measuring step conforms to a target flow rate.

With such a configuration, it is possible to control each of the pair of drive units such that the flow rate of the liquid measured in the measuring step conforms to the target flow rate while the generation of pulsation of the liquid is suppressed.

In the method for controlling a tube pump system according to another aspect of the present disclosure, the first predetermined pressure may be equal to or more than 30 kPaG and equal to or less than 150 kPaG.

With such a configuration, the first predetermined pressure of the liquid flowing through the pipe becomes sufficiently higher than the atmospheric pressure and hence, further transmission of pulsation of the liquid to the downstream side of the pipe can be suppressed.

Advantageous Effects

According to the present disclosure, it is possible to provide a tube pump system where pulsation of a liquid can be suppressed or eliminated without making an apparatus complicated and large-sized, and a method for controlling the tube pump system.

DESCRIPTION OF EMBODIMENTS

Hereinafter, a tube pump system and a method for controlling the tube pump system according to one embodiment of the present disclosure are explained with reference to drawings.

First Embodiment

Hereinafter, a tube pump system 700 according to a first embodiment of the present disclosure will be explained with reference to drawings.

The tube pump system 700 of this embodiment is an apparatus that supplies a liquid under pressure from an inflow end 701 to an outflow end 702 and, at the same time, controls a flow rate of the liquid supplied under pressure by a tube pump 100.

Figure 1:
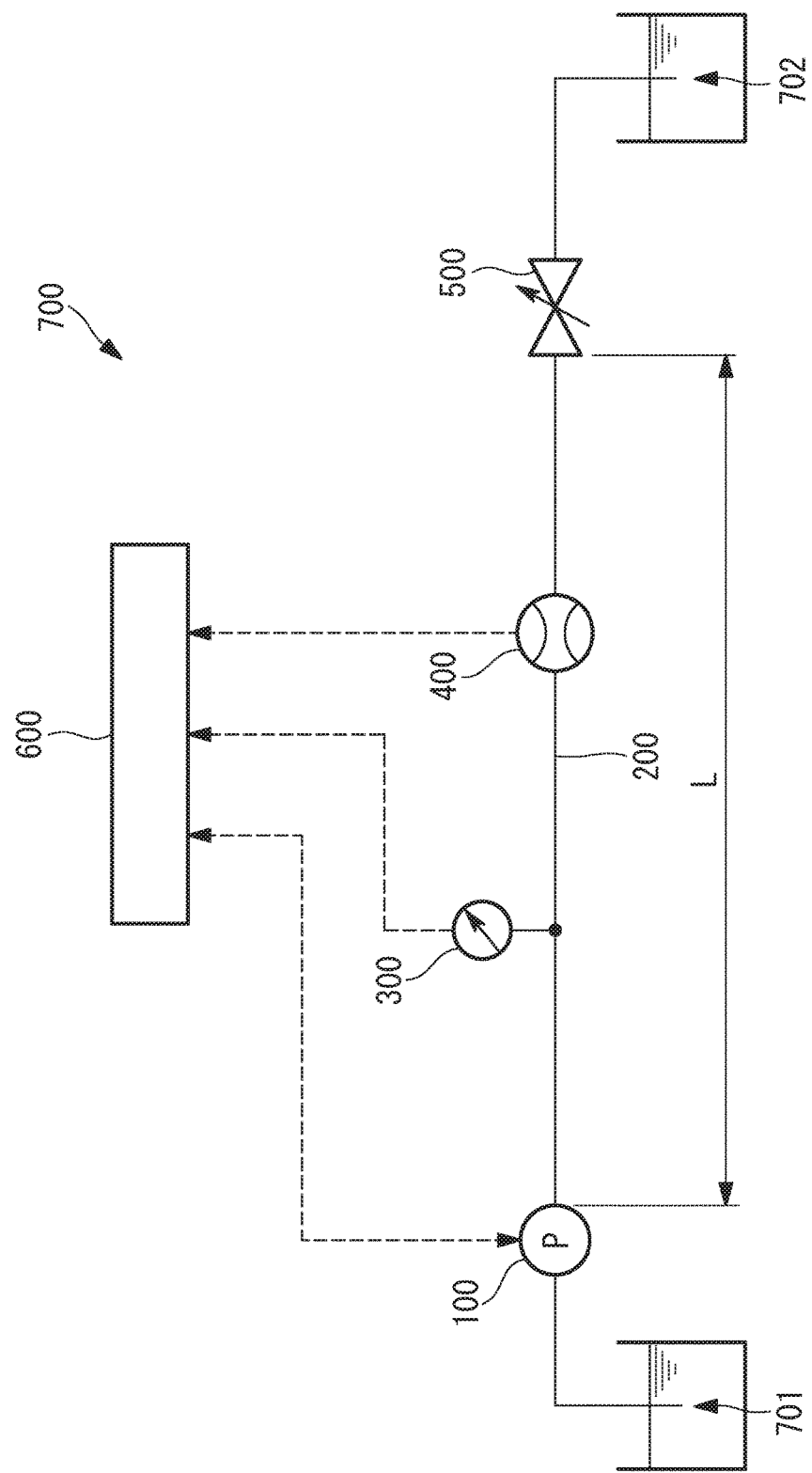
FIG. 1 is a configuration diagram showing a flow rate control apparatus according to a first embodiment.

As shown in FIG. 1, the tube pump system 700 of this embodiment includes: the tube pump 100 that supplies a liquid under pressure; a pipe 200 through which the liquid is conveyed from the tube pump 100 to a needle valve 500; a pressure sensor 300 that detects a pressure of the liquid flowing through the pipe 200; a flowmeter 400 that measures a flow rate of the liquid flowing through the pipe 200; a needle valve 500 that adjusts a pressure of the liquid flowing through the pipe 200 arranged on the upstream side of the needle valve 500; and a control unit 600 that controls a discharge amount of the liquid discharged from the tube pump 100.

Hereinafter, respective configurations of the tube pump system 700 of this embodiment are explained.

The tube pump 100 is a device that supplies a liquid under pressure from the inflow end 701 to the outflow end 702. The tube pump 100 supplies the liquid under pressure by repeating an operation where rollers are moved in a state where a tube having flexibility is compressed by the rollers. The liquid discharged from the tube pump 100 to the pipe 200 passes through the flowmeter 400 and the needle valve 500, and reaches the outflow end 702.

The tube pump 100 will be mentioned later in detail.

The pipe 200 is a pipe through which a liquid is conveyed from the tube pump 100 to the needle valve 500. The pipe 200 is made of a resin material (for example, a silicone resin) having flexibility that is elastically deformed due to a pressure of the liquid supplied under pressure by the tube pump 100. The pipe 200 can maintain a pressure of the liquid flowing through the inside of the pipe 200 at a first predetermined pressure Pr1 which is higher than an atmospheric pressure by adjusting an opening degree of the needle valve 500 mentioned later.

A flow path length L of the pipe 200 is desirably set to approximately 1000 mm, for example.

The pressure sensor 300 is a device that detects a pressure of the liquid flowing through the inside of the pipe 200. The pressure sensor 300 is arranged on the pipe 200 through which the liquid is introduced from the tube pump 100 to the needle valve 500, at a position on the upstream side of the flowmeter 400. The pressure sensor 300 transmits the detected pressure to the control unit 600.

The flowmeter 400 is a device that measures a flow rate of the liquid flowing through the inside of the pipe 200. The flowmeter 400 is arranged on the pipe 200 through which the liquid is introduced from the tube pump 100 to the needle valve 500 at a position on the downstream side of the pressure sensor 300. The flowmeter 400 transmits the measured flow rate to the control unit 600.

The needle valve 500 is a device that adjusts a flow rate of a fluid flowing through the needle valve 500 from the pipe 200 to the outflow end 702 by adjusting an insertion amount of a needle-shaped valve body (illustration is omitted) with respect to a valve hole (illustration is omitted). The needle valve 500 forms a region having a minimum flow path cross sectional area in a path through which the liquid is introduced from the tube pump 100 to the outflow end 702.

The needle valve 500 is made to have a minimum flow path cross sectional area in order to allow the needle valve 500 to have a highest pipe resistance in the path through which the liquid is introduced from the tube pump 100 to the outflow end 702. Therefore, the liquid in the pipe 200 on the upstream side of the needle valve 500 is maintained at a high static pressure. In this embodiment, the opening degree of the needle valve 500 is adjusted such that a pressure of a liquid flowing through the inside of the pipe 200 conforms to the first predetermined pressure Pr1 which is higher than an atmospheric pressure.

In this embodiment, the first predetermined pressure Pr1 is desirably set to a value which falls within a range of equal to or more than 30 kPaG and equal to or less than 150 kPaG. Particularly, the first predetermined pressure Pr1 is desirably set to a value which falls within a range of equal to or more than 90 kPaG and equal to or less than 110 kPaG. Reference character "G" denotes a gauge pressure.

The pipe 200, where a liquid is maintained in the inside of the pipe 200 with a high static pressure, is made of a flexible resin material. This is because when a static pressure in the pipe 200 is further increased by pulsation of the liquid, the pipe 200 is elastically deformed and hence, transmission of pulsation of the liquid to the downstream side can be suppressed.

As described above, in the path through which a liquid is introduced from the tube pump 100 to the outflow end 702, the pipe 200 made of a flexible resin material is arranged on the upstream side of the needle valve 500 having the highest pipe resistance and hence, pulsation of the liquid supplied under pressure from the tube pump 100 can be suppressed.

The control unit 600 is a device that controls a first drive unit 50 and a second drive unit 60 mentioned later respectively such that a liquid which flows into a flexible tube of the tube pump 100 from one end of the tube is discharged from the other end of the tube.

The control unit 600 controls each of the first drive unit 50 and the second drive unit 60 such that the pressure transmitted from the pressure sensor 300 agrees with the first predetermined pressure Pr1. The control unit 600 also controls each of the first drive unit 50 and the second drive unit 60 such that a flow rate measured by the flowmeter 400 conforms to a predetermined target flow rate. A method for controlling the first drive unit 50 and the second drive unit 60 by the control unit 600 will be mentioned later in detail.

Next, the tube pump 100 of the tube pump system 700 will be explained.

Figure 2:
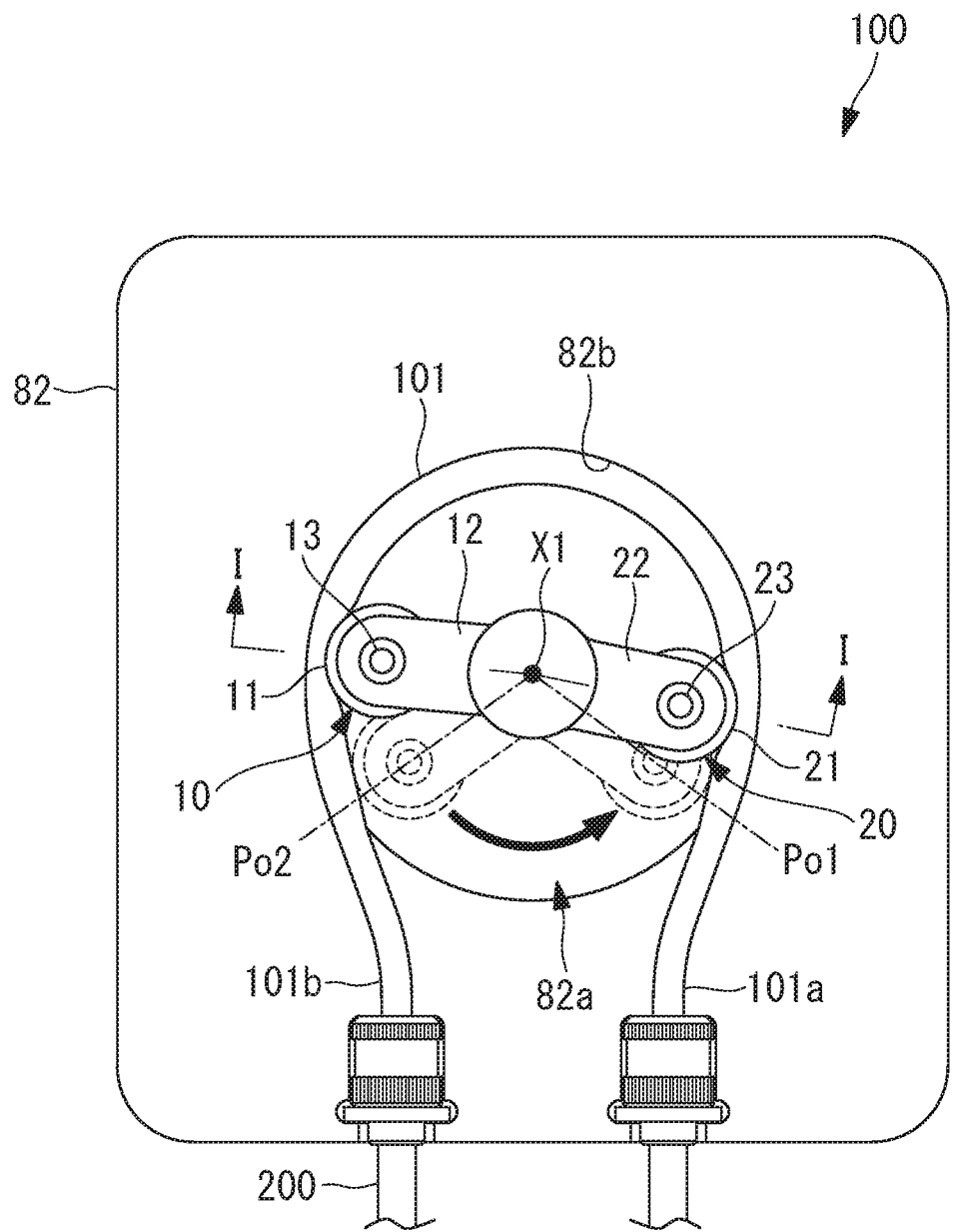
FIG. 2 is a plan view of a tube pump shown in FIG. 1.

The tube pump 100 of this embodiment shown in FIG. 2 is a device where a first roller unit 10 (first contact member) and a second roller unit 20 (second contact member) are rotated around an axis line X1 (first axis line) in the same direction so as to make a fluid in a tube 101 which flows into the tube 101 discharge from an inflow-side end portion 101a to an outflow-side end portion 101b. The pipe 200 is connected to the outflow-side end portion 101b.

Figure 3:
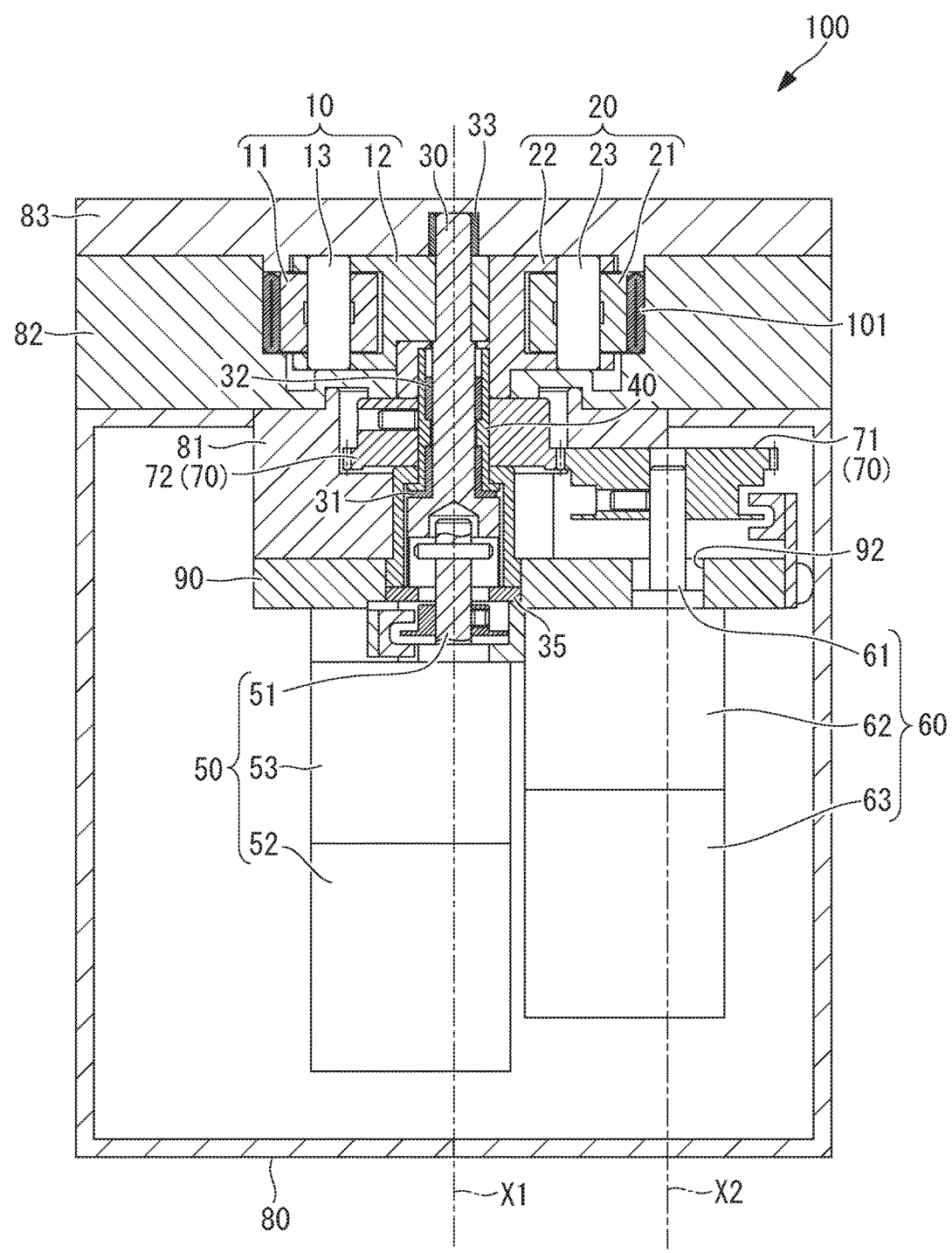
FIG. 3 is a longitudinal cross-sectional view of the tube pump shown in FIG. 2 taken along a line I-I.

FIG. 2 shows the tube pump 100 in a state where a cover 83 shown in FIG. 3 is removed.

As shown in FIG. 2 which is a front view, in the tube pump 100, the tube 101 is arranged in a circular-arc shape around the axis line X1 along an inner peripheral surface 82b of a recess 82a of a roller housing unit 82 that houses the first roller unit 10 and the second roller unit 20. As shown in FIG. 2, the first roller unit 10 and the second roller unit 20 housed in the roller housing unit 82 are rotated around the axis line X1 along a counter-clockwise rotation direction (a direction shown by an arrow in FIG. 2) while being in contact with the tube 101.

In FIG. 2 which is a front view, a contact position Po1 indicates a position around the axis line X1 at which a state of the first roller unit 10 or the second roller unit 20 changes over from a state where the first roller unit 10 or the second roller unit 20 is separated from the tube 101 to a state where the first roller unit 10 or the second roller unit 20 is in contact with the tube 101. Further, a separate position Po2 indicates a position around the axis line X1 at which a state of the first roller unit 10 or the second roller unit 20 changes over from a state where the first roller unit 10 or the second roller unit 20 is in contact with the tube 101 to a state where the first roller unit 10 or the second roller unit 20 is separated from the tube 101. Broken lines shown in FIG. 2 indicate the first roller unit 10 and the second roller unit 20 arranged at the contact position Po1 and the separate position Po2.

Until the first roller unit 10 and the second roller unit 20 reaches the separate position Po2 from the contact position Po1, the first roller unit 10 and the second roller unit 20 are rotated around the axis line X1 independently in a state where the first roller unit 10 and the second roller unit 20 compress the tube 101 in cooperation with the inner peripheral surface 82b.

Figure 4:
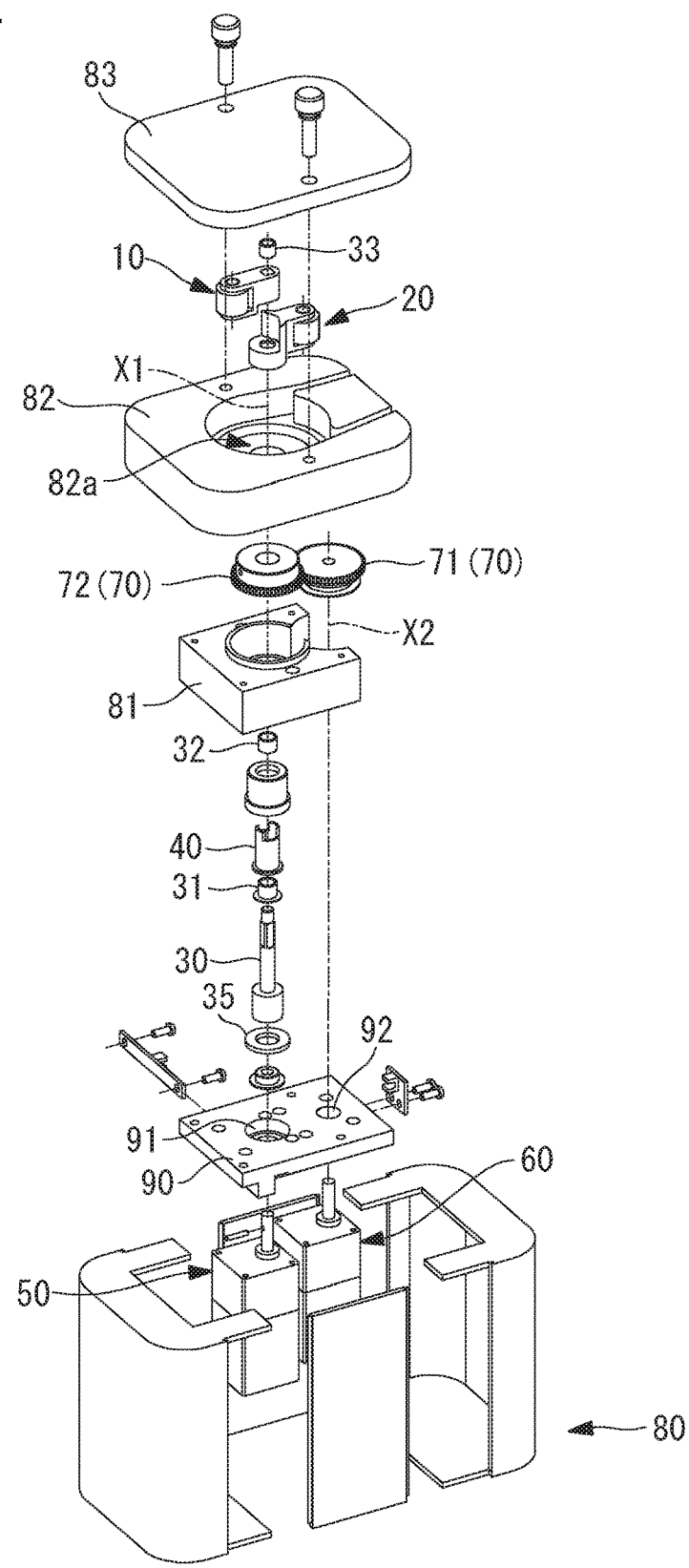
FIG. 4 is an exploded perspective view of the tube pump shown in FIG. 3.

As shown in a longitudinal cross-sectional view of FIG. 3 and an exploded perspective view of FIG. 4, the tube pump 100 of the embodiment includes: the first roller unit 10 and the second roller unit 20 that rotate around the axis X1 while being in contact with the tube 101; a drive shaft 30 (a shaft member) that is arranged on the axis X1 and is coupled to the first roller unit 10; a drive cylinder (a cylindrical member) 40 that is coupled to the second roller unit 20; a first drive unit 50 that transmits a drive force to the drive shaft 30; a second drive unit 60; and a transmission mechanism 70 (a transmission unit) that transmits a drive force of the second drive unit 60 to the drive cylinder 40.

The first roller unit 10 has: a first roller 11 that rotates around an axis parallel to the axis X1 while being in contact with the tube 101; a first roller support member 12 coupled to the drive shaft 30 so as to integrally rotate around the axis X1; and a first roller shaft 13 both ends of which are supported by the first roller support member 12, and to which the first roller 11 is rotatably attached.

The second roller unit 20 has: a second roller 21 that rotates around an axis parallel to the axis X1 while being in contact with the tube 101; a second roller support member 22 coupled to the drive cylinder 40 so as to integrally rotate around the axis X1; and a second roller shaft 23 both ends of which are supported by the second roller support member 22, and to which the second roller 21 is rotatably attached.

As shown in FIG. 3, the first drive unit 50 and the second drive unit 60 are housed inside a casing (a housing member) 80. A gear housing unit 81 for housing the transmission mechanism 70, and a support member 90 that supports the first drive unit 50 and the second drive unit 60 are attached to an inside of the casing 80. In addition, the roller housing unit 82 for housing the first roller unit 10 and the second roller unit 20 is attached to an upper part of the casing 80.

The roller housing unit 82 has the recess 82a that houses the first roller unit 10 and the second roller unit 20. The recess 82a has the inner peripheral surface 82b formed into a circular-arc shape around the axis line X1.

As shown in FIG. 3, the tube 101 is arranged in a circular-arc shape around the axis line X1 along the inner peripheral surface 82b.

A first through hole 91 that extends along the axis X1 and a second through hole 92 that extends along an axis X2 are formed in the support member 90. The first drive unit 50 is attached to the support member 90 by a fastening bolt (illustration is omitted) in a state where a first drive shaft 51 is inserted into the first through hole 91 formed in the support member 90. Similarly, the second drive unit 60 is attached to the support member 90 by a fastening bolt (illustration is omitted) in a state where a second drive shaft 61 is inserted into the second through hole 92 formed in the support member 90. As described above, each of the first drive unit 50 and the second drive unit 60 is attached to the support member 90, which is the integrally formed member.

Figure 5:
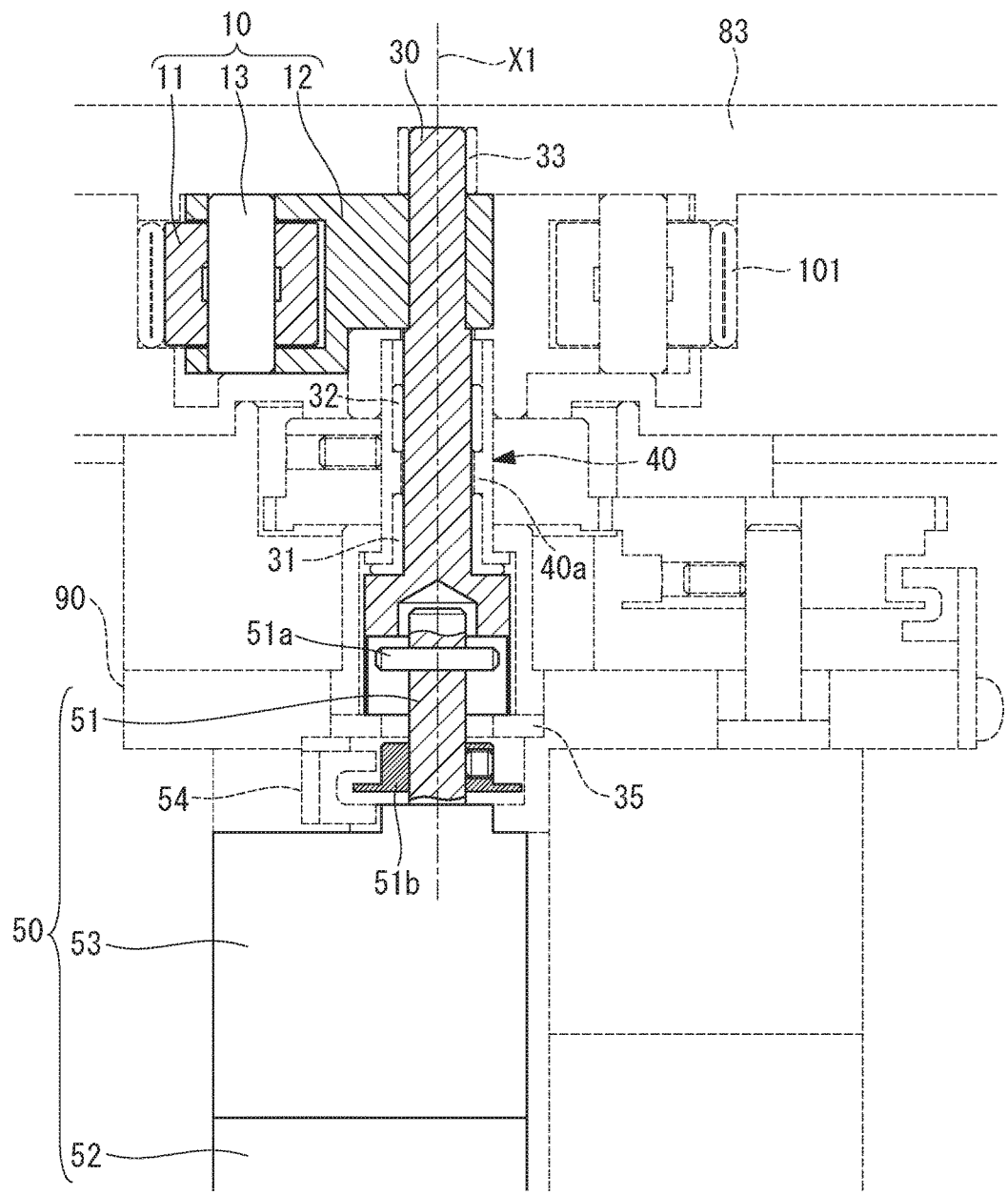
FIG. 5 is a longitudinal cross-sectional view showing a structure in which a first drive unit shown in FIG. 3 transmits a drive force to a first roller unit.

Here, with reference to FIG. 5, there will be explained a structure in which the first drive unit 50 transmits a drive force to the first roller unit 10. In FIG. 5, a portion shown by continuous lines is the portion included in the structure of transmitting a drive force of the first drive unit 50 to the first roller unit 10.

As shown in FIG. 5, the first drive unit 50 has the first drive shaft 51 that is arranged on the axis X1 and is coupled to the drive shaft 30. The first drive shaft 51 is attached to a lower end of the drive shaft 30 in a state where a pin 51*a* that extends in a direction perpendicular to the axis X1 is inserted into the first drive shaft 51. The drive shaft 30 is fixed to the first drive shaft 51 by the pin 51*a* so as not to relatively rotate around the axis X1. Therefore, when the first drive unit 50 rotates the first drive shaft 51 around the axis X1, a drive force of the first drive shaft 51 is transmitted to the drive shaft 30, and the drive shaft 30 rotates around the axis X1.

The first drive unit 50 has; the first drive shaft 51; the first electric motor 52; and a first reducer 53 that reduces a velocity of rotation of a rotation shaft (illustration is omitted) rotated by the first electric motor 52, and transmits the rotation to the first drive shaft 51. The first drive unit 50 rotates the first drive shaft 51 around the axis X1 by transmitting a drive force of the first electric motor 52 to the first drive shaft 51.

A position detecting member 51*b* that rotates around the axis X1 together with the first drive shaft 51 is attached to the first drive shaft 51. In the position detecting member 51*b*, in an annularly formed outer peripheral edge, a slit (illustration is omitted) for detecting a rotation position of the first roller unit 10 around the axis X1 is formed in a peripheral direction around the axis X1.

As shown in FIG. 5, a position detection sensor 54 is arranged so as to sandwich an upper surface and a lower surface of the outer peripheral edge of the position detecting member 51*b*. The position detection sensor 54 is the sensor in which a light-emitting element is arranged on one of an upper surface side and a lower surface side, and in which a light-receiving element is arranged on the other of the upper surface side and the lower surface side. The position detection sensor 54 detects a rotation position indicating which position the first roller unit 10 is arranged around the axis X1 by detecting by the light-receiving element through the slit that light emitted by the light-emitting element passes through in connection with the rotation of the position detecting member 51*b* around the axis X1, and transmits it to a control unit 600.

The lower end of the drive shaft 30 is coupled to the first drive shaft 51, and an upper end thereof is inserted into an insertion hole formed in the cover 83. A third bearing member 33 that rotatably supports a tip of the first drive shaft 51 around the axis X1 is inserted into the insertion hole of the cover 83.

In addition, the drive shaft 30 is rotatably supported around the axis X1 on an inner peripheral side of the drive cylinder 40 by a cylindrical first bearing member 31 inserted along the outer peripheral surface, and a cylindrical second bearing member 32 formed independently from the first bearing member 31.

As described above, in the drive shaft 30, the outer peripheral surface of a lower end side is supported by the first bearing member 31, the outer peripheral surface of a central portion is supported by the second bearing member 32, and the outer peripheral surface of a tip side is supported by the third bearing member 33. Therefore, the drive shaft 30 smoothly rotates around the axis X1 in a state of holding a central axis on the axis X1.

Here, a reason why the first bearing member 31 and the second bearing member 32 are arranged in the axis X1 direction in a state of being separated from each other as shown in FIG. 5 is that an endless annular projection part 40*a* that extends around the axis X1 is formed at an inner peripheral surface of the drive cylinder 40.

The first roller support member 12 of the first roller unit 10 is coupled to the tip side of the drive shaft 30 so as to integrally rotate around the axis X1.

As described above, the drive force by which the first drive unit 50 rotates the first drive shaft 51 around the axis X1 is transmitted from the first drive shaft 51 to the first roller unit 10 through the drive shaft 30.

As shown in FIG. 5, the lower end of the drive shaft 30 is supported by an upper surface of an annularly formed thrust bearing 35, and a lower surface of the thrust bearing 35 is supported by the support member 90. Therefore, in a case where a downward thrust force is added to the drive shaft 30 along the axis X1, the thrust force is supported by the thrust bearing 35 without being transmitted to the first reducer 53 and the first electric motor 52.

Therefore, in the case where the downward thrust force is added to the drive shaft 30 along the axis X1, it is suppressed by the thrust force that impact is added to the first reducer 53 and the first electric motor 52.

Figure 6:
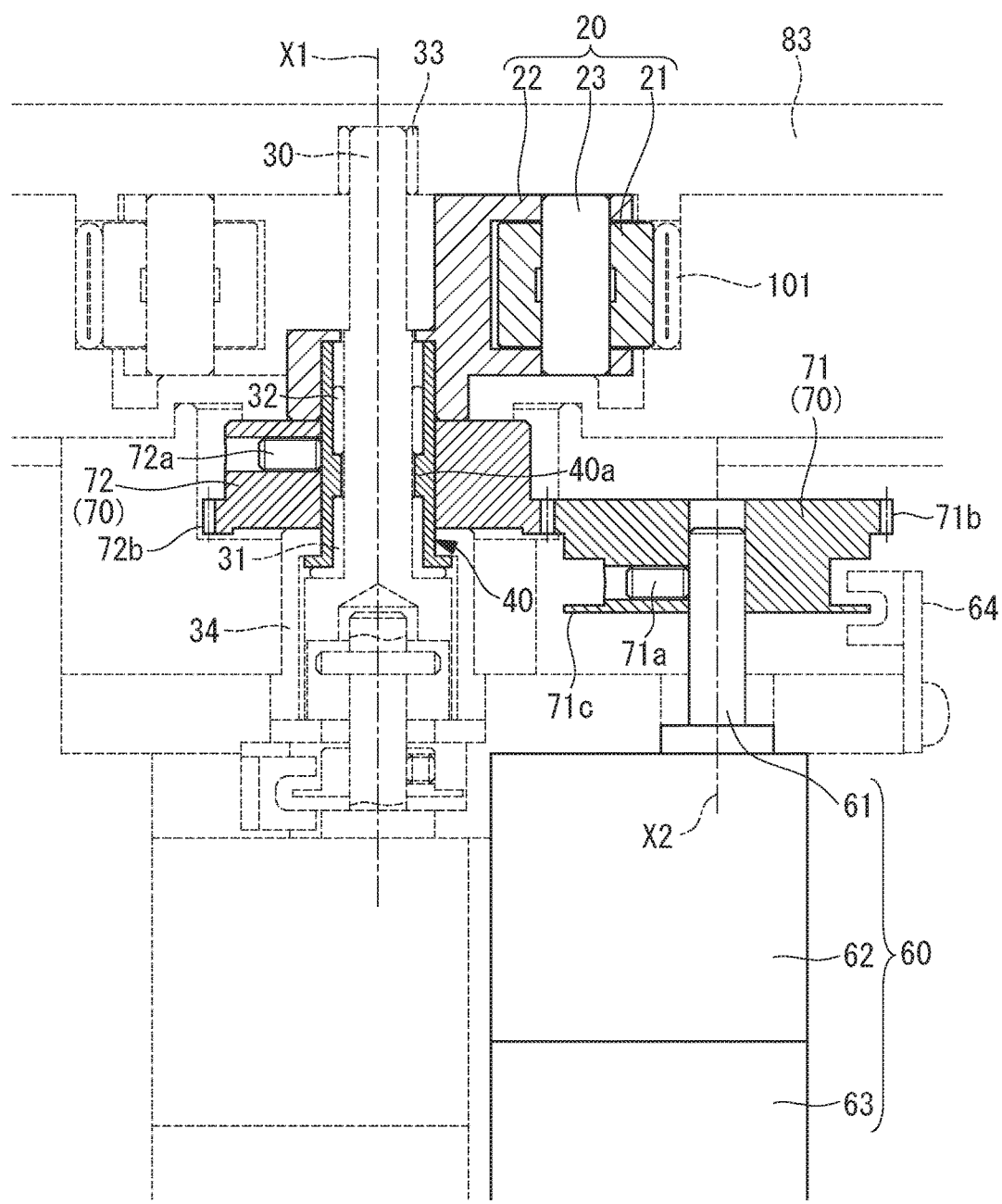
FIG. 6 is a longitudinal cross-sectional view showing a structure in which a second drive unit shown in FIG. 3 transmits a drive force to a second roller unit.

Next, with reference to FIG. 6, there will be explained a structure in which the second drive unit 60 transmits a drive force to the first roller unit 10. In FIG. 6, a portion shown by continuous lines is the portion included in the structure of transmitting the drive force of the second drive unit 60 to the second roller unit 20. The structure shown in FIG. 6 has: the second roller unit 20; the drive cylinder 40; the second drive unit 60; and the transmission mechanism 70.

The transmission mechanism 70 shown in FIG. 6 has: a first gear unit 71 that rotates around the axis X2 (a second axis) parallel to the axis X1; and a second gear unit 72 to which a drive force of the second drive shaft 61 is transmitted from the first gear unit 71. The transmission mechanism 70 transmits the drive force of the second drive shaft 61 around the axis X2 to the outer peripheral surface of the drive cylinder 40, and rotates the drive cylinder 40 around the axis X1.

As shown in FIG. 6, the second drive unit 60 has; the second drive shaft 61 arranged on the axis X2; a second electric motor 62; and a second reducer 63 that reduces a velocity of rotation of a rotation shaft (illustration is omitted) rotated by the second electric motor 62, and transmits the rotation to the second drive shaft 61. The second drive unit 60 rotates the second drive shaft 61 around the axis X2 by transmitting a drive force of the second electric motor 62 to the second drive shaft 61.

The second drive shaft 61 is inserted into an insertion hole formed in a central portion of the first gear unit 71 formed in a cylindrical shape around the axis X2. The first gear unit 71 is fixed to the second drive shaft 61 by fastening a fixing screw 71*a* in a state where the second drive shaft 61 is inserted into the first gear unit 71, and making a tip of the fixing screw 71*a* abut against the second drive shaft 61. In a manner as described above, the first gear unit 71 is coupled to the second drive shaft 61, and rotates around the axis X2 together with the second drive shaft 61.

A first gear 71*b* of the first gear unit 71 formed around the axis X2 is engaged with a second gear 72*b* of the second gear unit 72 formed around the axis X1. Therefore, a drive force by rotation of the first gear unit 71 around the axis X2 is transmitted as the drive force that rotates the second gear unit 72 around the axis X1.

A position detecting member 71*c* that rotates around the axis X1 together with the second drive shaft 61 is formed at the first gear unit 71. In the position detecting member 71*c*, in an annularly formed outer peripheral edge, a slit (illustration is omitted) for detecting a rotation position of the second roller unit 20 around the axis X1 is formed in a peripheral direction around the axis X2.

As shown in FIG. 6, a position detection sensor 64 is arranged so as to sandwich an upper surface and a lower surface of an outer peripheral edge of the position detecting member 71*c*. The position detection sensor 64 is the sensor in which a light-emitting element is arranged on one of an upper surface side and a lower surface side, and in which a light-receiving element is arranged on the other of the upper surface side and the lower surface side. The position detection sensor 64 detects a rotation position indicating which position the second roller unit 20 is arranged around the axis X1 by detecting by the light-receiving element through the slit that light emitted by the light-emitting element passes through in connection with the rotation of the position detecting member 71*c* around the axis X2, and transmits it to the control unit 600.

The drive cylinder 40 is inserted into an insertion hole formed in a central portion of the second gear unit 72 formed in a cylindrical shape around the axis X1. The insertion hole is a hole having an inner peripheral surface coupled to the outer peripheral surface of the drive cylinder 40.

The second gear unit 72 is fixed to the drive cylinder 40 by fastening a fixing screw 72*a* in a state where the drive cylinder 40 is inserted into the second gear unit 72, and making a tip of the fixing screw 72*a* abut against the drive cylinder 40. In a manner as described above, the second gear unit 72 is coupled to the drive cylinder 40, and rotates around the axis X1 together with the drive cylinder 40.

As shown in FIG. 6, the drive cylinder 40 is arranged in a state of sandwiching the first bearing member 31 and the second bearing member 32 on an outer peripheral side of the drive shaft 30. Therefore, the drive cylinder 40 can be rotated around the axis X1 independently from the drive shaft 30. The drive shaft 30 rotates around the axis X1 by the drive force by the first drive unit 50, and the drive cylinder 40 rotates around the axis X1 by the drive force by the second drive unit 60 in a state of being independent from the drive shaft 30.

The second roller support member 22 of the second roller unit 20 is coupled to a tip side of the drive cylinder 40 so as to integrally rotate around the axis X1.

As described above, the drive force by which the second drive unit 60 rotates the second drive shaft 61 around the axis X2 is transmitted to the outer peripheral surface of the drive cylinder 40 by the transmission mechanism 70, and is transmitted from the drive cylinder 40 to the second roller unit 20.

Next, discharging of a liquid performed by the tube pump system 700 of this embodiment will be explained with reference to drawings.

As shown in FIG. 1, the tube pump system 700 of this embodiment detects a pressure of the liquid discharged from the tube pump 100 to the pipe 200 by the pressure sensor 300, and transmits the pressure of the liquid to the control unit 600. The tube pump system 700 also measures a flow rate of the liquid flowing through the pipe 200 by the flowmeter, and transmits the flow rate of the liquid to the control unit 600. The control unit 600 controls angular velocities of the first roller unit 10 and the second roller unit 20 around the axis line X1 such that the flow rate of the liquid flowing through the pipe 200 agrees with a target flow rate. An operator of the tube pump system 700 adjusts an opening degree of the needle valve 500 such that a pressure of a liquid detected by the pressure sensor 300 agrees with the first predetermined pressure Pr1.

In the tube pump system 700 shown in FIG. 1, a control signal for controlling the first drive unit 50 and the second drive unit 60 of the tube pump 100 is transmitted from the control unit 600 to the tube pump 100.

The tube pump 100 may be formed as a device in which the control unit 600 is incorporated. In this case, the control unit 600 incorporated in the tube pump 100 generates a control signal for controlling the first drive unit 50 and the second drive unit 60, and transmits the control signal to the first drive unit 50 and the second drive unit 60.

An example shown in FIG. 7 to FIG. 18 is an example where a liquid in which pulsation is not generated (a liquid in which the fluctuation of the flow rate is not generated) flows into the tube 101 from the inflow-side end portion 101*a* of the tube 101, and the liquid is discharged from the outflow-side end portion 101*b* in a state where pulsation is not generated in the liquid.

FIG. 7 to FIG. 10 are plan views showing the tube pump 100, and chronologically show states where the first roller unit 10 approaches the separate position Po2. FIG. 11 to FIG. 14 are partially enlarged views of the first roller 11 of the tube pump 100 shown in FIG. 7 to FIG. 10 and an area in the vicinity of the first roller 11. Each of FIG. 15 to FIG. 18 is a longitudinal cross-sectional view of the tube 101 shown in FIG. 11 to FIG. 14.

Figure 7:
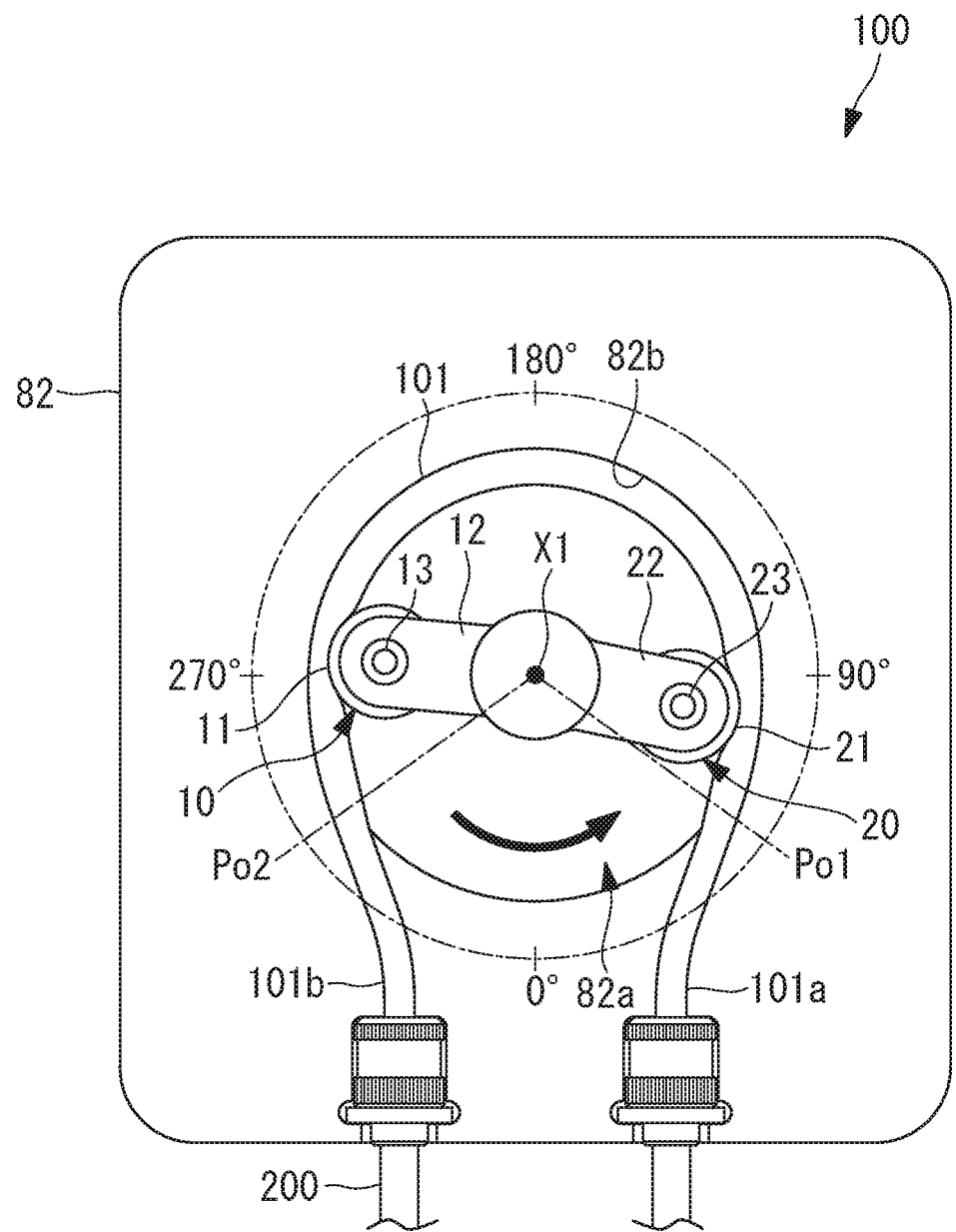
FIG. 7 is a plan view showing the tube pump in a state where a tube is closed.
Figure 11:
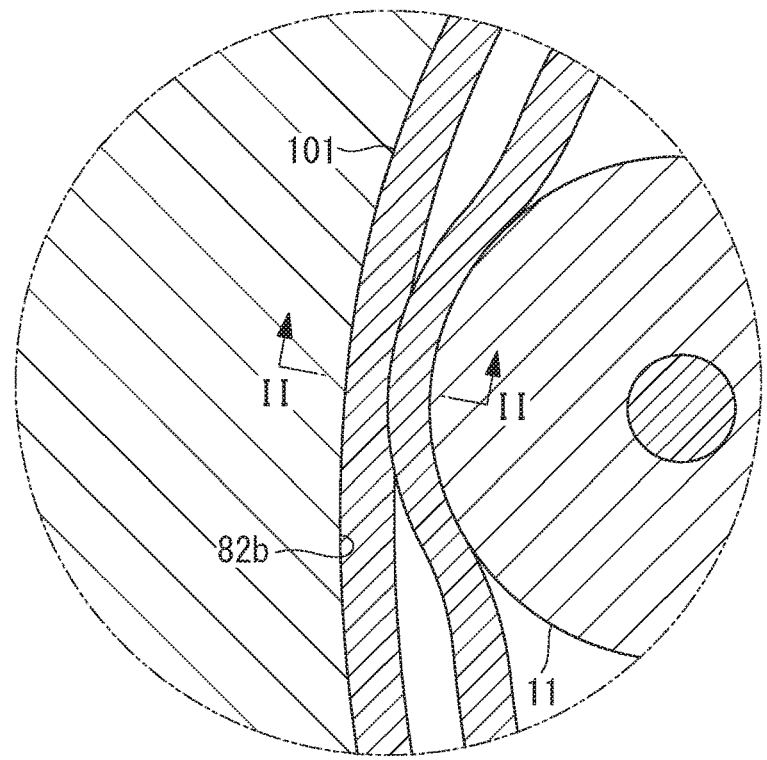
FIG. 11 is a partially enlarged view of the tube pump shown in FIG. 7.
Figure 15:
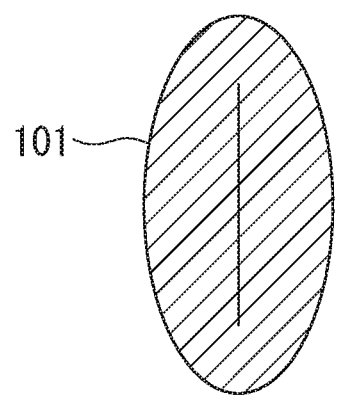
FIG. 15 is a cross-sectional view of the tube shown in FIG. 11 taken along a line II-II.

FIG. 7 is a plan view showing the tube pump 100 in a state where the tube 101 is closed. The state where the tube 101 is closed means a state where, as shown in FIG. 11 and FIG. 15, the first roller 11 of the first roller unit 10 compresses the tube 101. At this point of time, a flow path cross sectional area of the tube 101 shown in FIG. 15 becomes zero.

Figure 8:
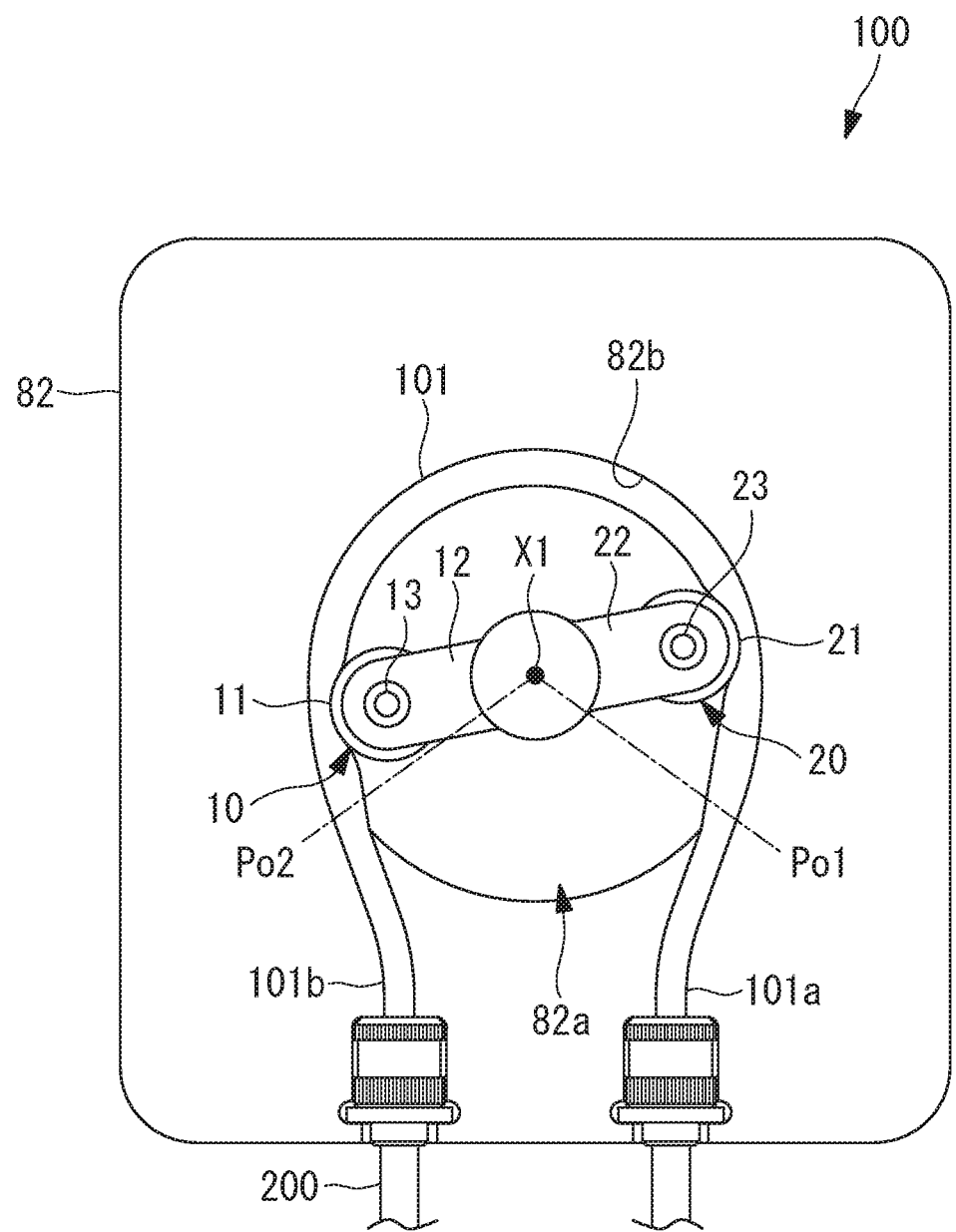
FIG. 8 is a plan view showing the tube pump in a state where the tube starts to open.
Figure 12:
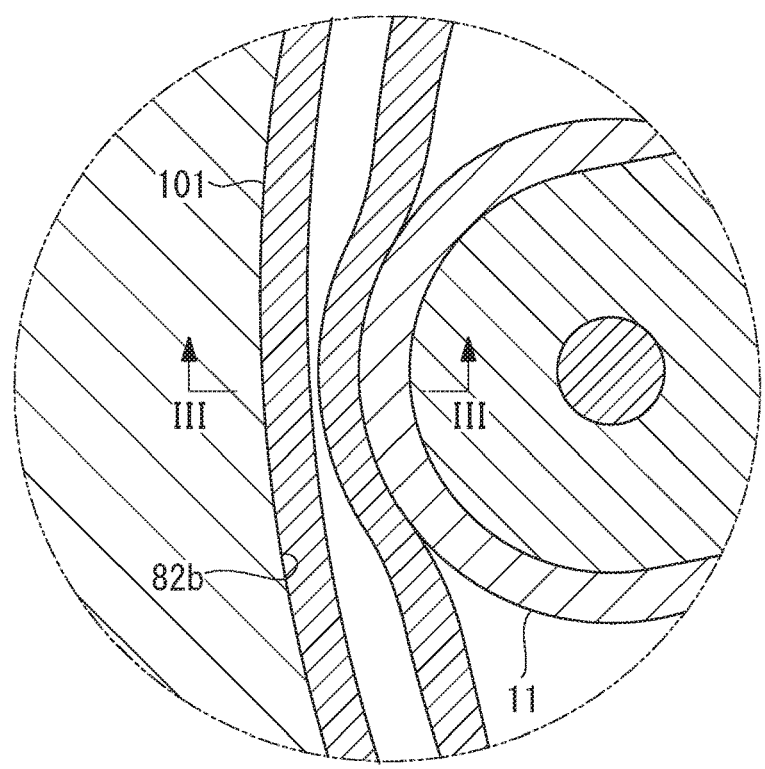
FIG. 12 is a partially enlarged view of the tube pump shown in FIG. 8.
Figure 16:
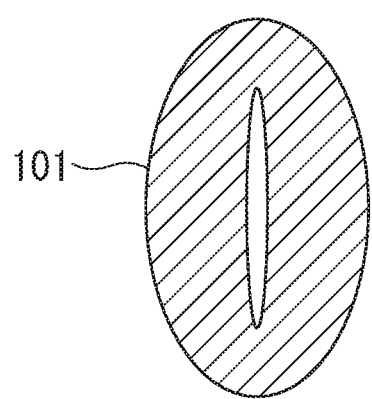
FIG. 16 is a cross-sectional view of the tube shown in FIG. 12 taken along a line III-III.

FIG. 8 is a plan view showing the tube pump 100 in a state where the tube 101 starts to open. The state where the tube 101 starts to open means a state where, as shown in FIG. 12 and FIG. 16, the release of a state where the first roller 11 of the first roller unit 10 compresses the tube 101 is started. At this point of time, a flow path cross sectional area of the tube 101 shown in FIG. 16 assumes a value larger than zero.

Figure 9:
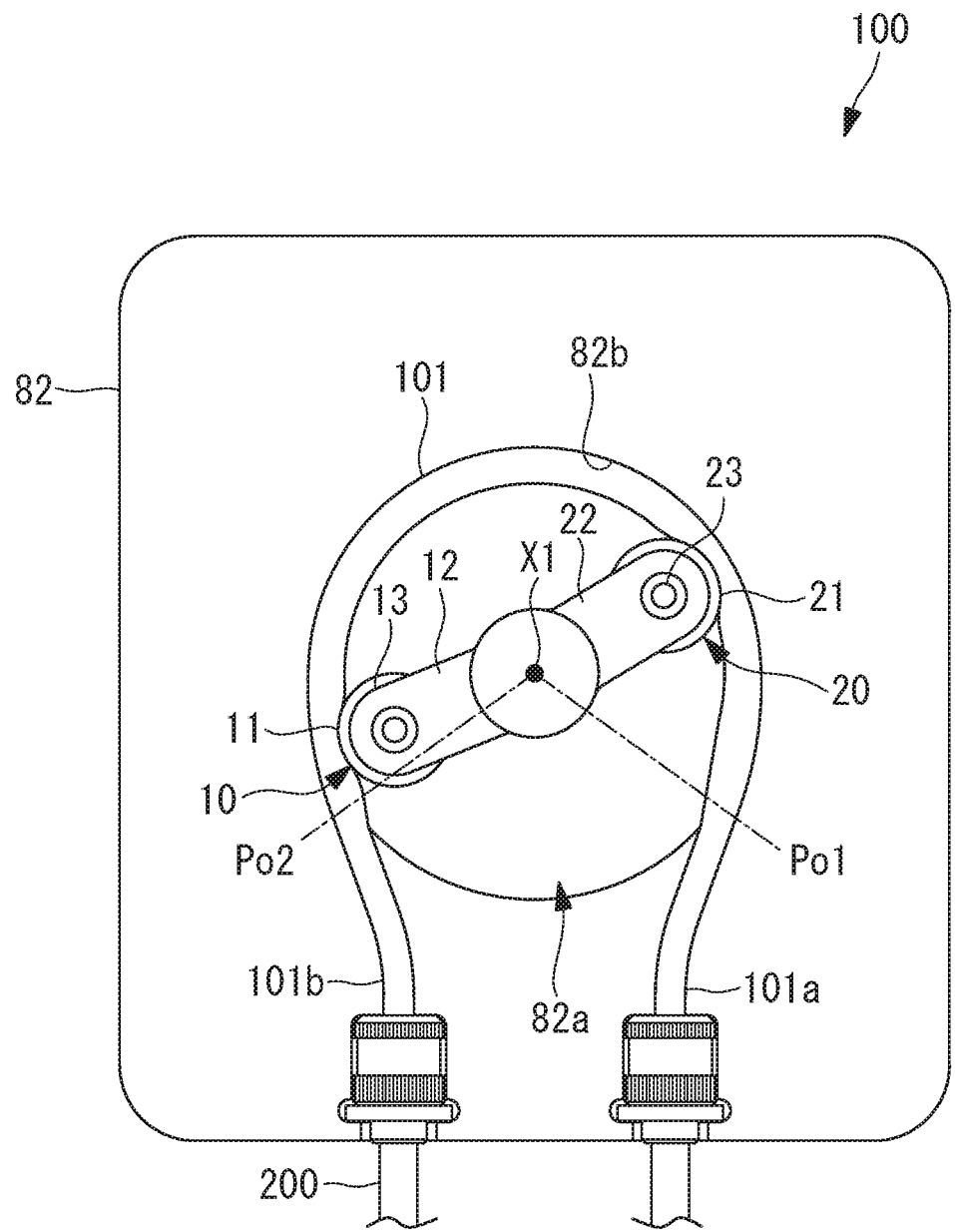
FIG. 9 is a plan view showing the tube pump in a state where the tube is open.
Figure 13:
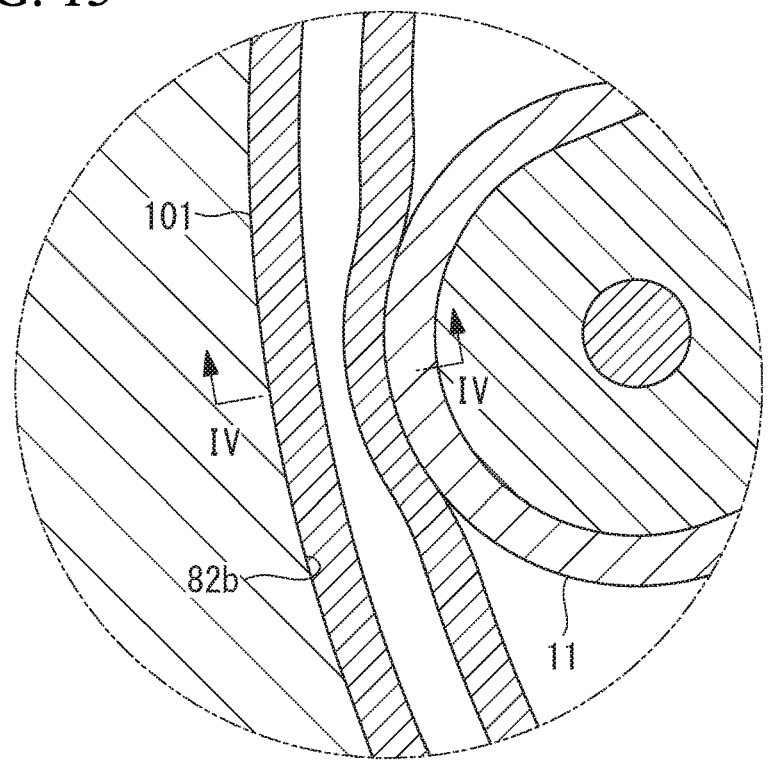
FIG. 13 is a partially enlarged view of the tube pump shown in FIG. 9.
Figure 17:
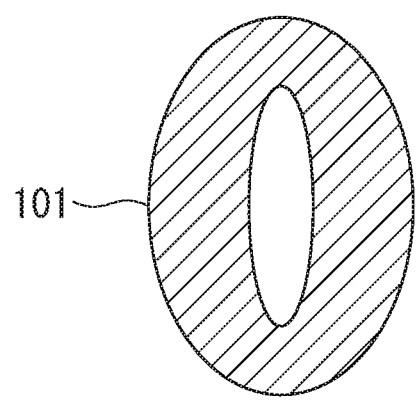
FIG. 17 is a cross-sectional view of the tube shown in FIG. 13 taken along a line IV-IV.

FIG. 9 is a plan view showing the tube pump 100 in a state where the tube 101 is open. The state where the tube 101 is open means a state where, as shown in FIG. 13 and FIG. 17, the state where the first roller 11 of the first roller unit 10 compresses the tube 101 is released. At this point of time, a flow path cross sectional area of the tube 101 shown in FIG. 17 is substantially equal to the flow path cross sectional area of the tube 101 in a state where the first roller 11 is not brought into contact with the tube 101.

Figure 10:
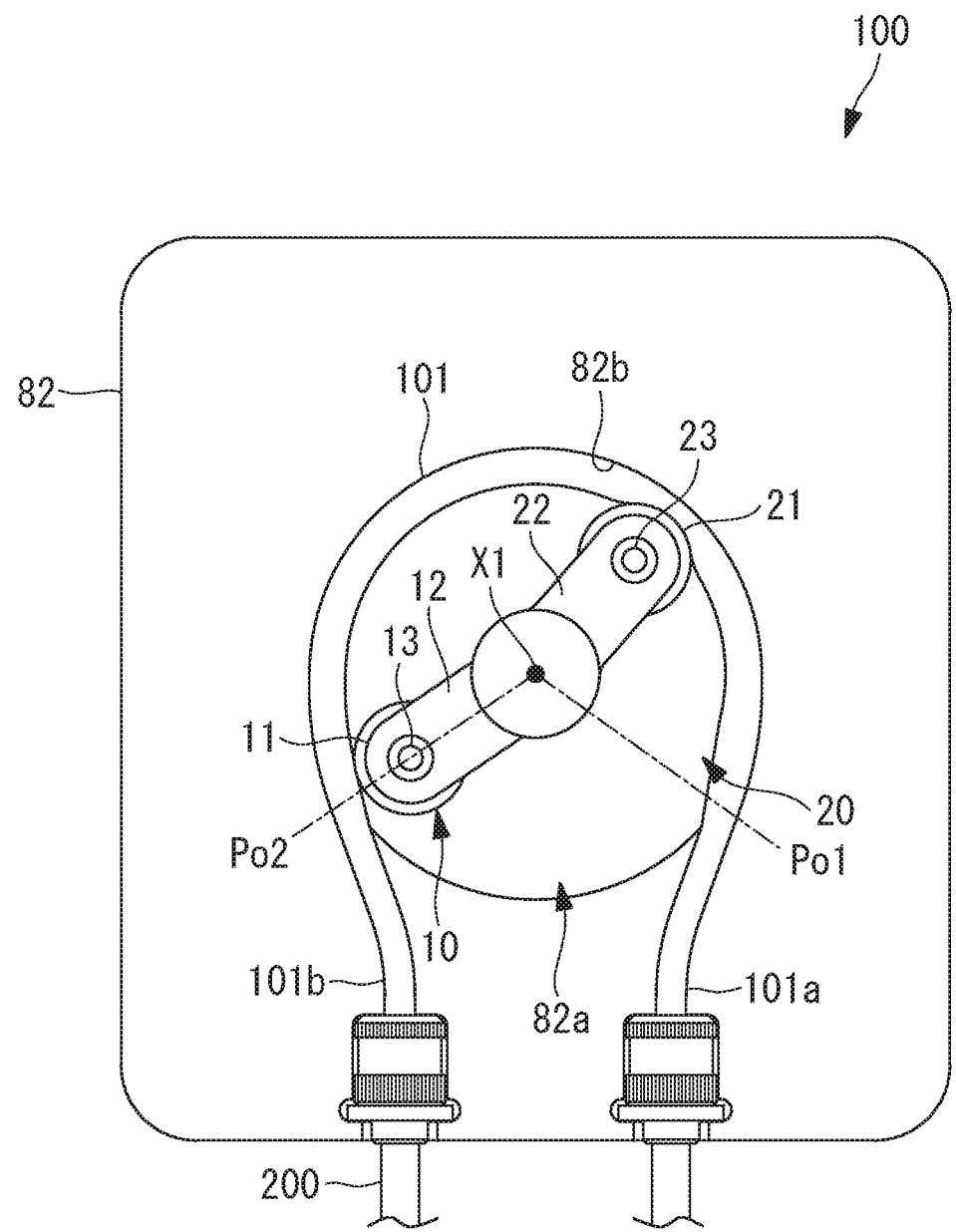
FIG. 10 is a view showing the tube pump in a state where the first roller unit reaches a separate position.
Figure 14:
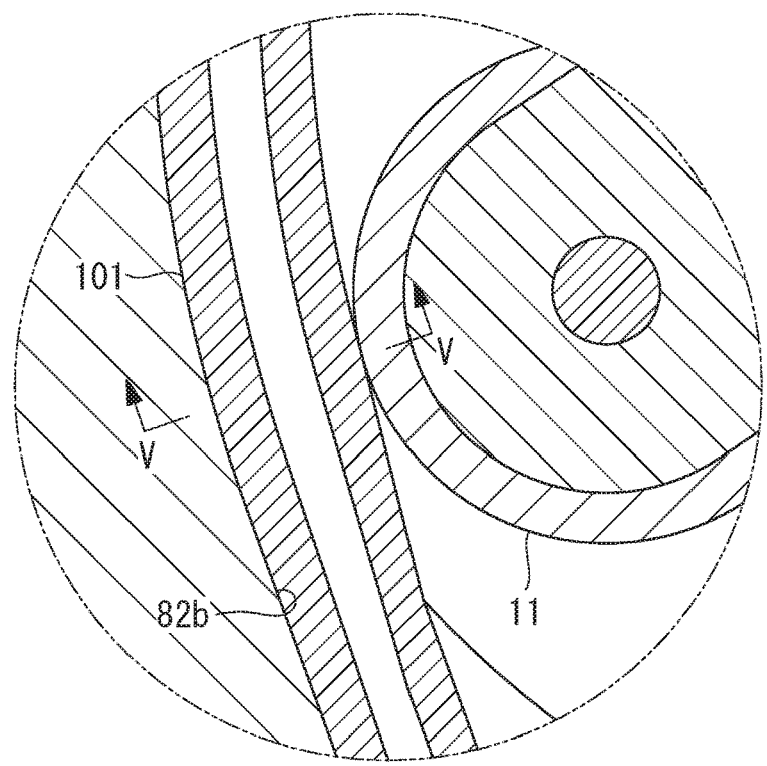
FIG. 14 is a partially enlarged view of the tube pump shown in FIG. 10.
Figure 18:
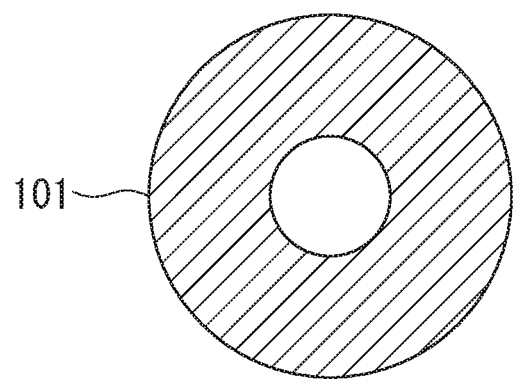
FIG. 18 is a cross-sectional view of the tube shown in FIG. 14 taken along a line V-V.

FIG. 10 is a plan view showing the tube pump 100 in a state where the first roller unit 10 reaches the separate position Po2. The state where the first roller unit 10 reaches the separate position Po2 means a state where, as shown in FIG. 14 and FIG. 18, deformation of the tube 101 caused by the first roller unit 10 is released. At this point of time, a flow path cross sectional area of the tube 101 shown in FIG. 18 is substantially equal to the flow path cross sectional area of the tube 101 shown in FIG. 17. This means that after the first roller unit 10 reaches a position shown in FIG. 9, although deformation of the tube 101 is gradually released, a flow path cross sectional area of the tube 101 does not change.

Figure 19:
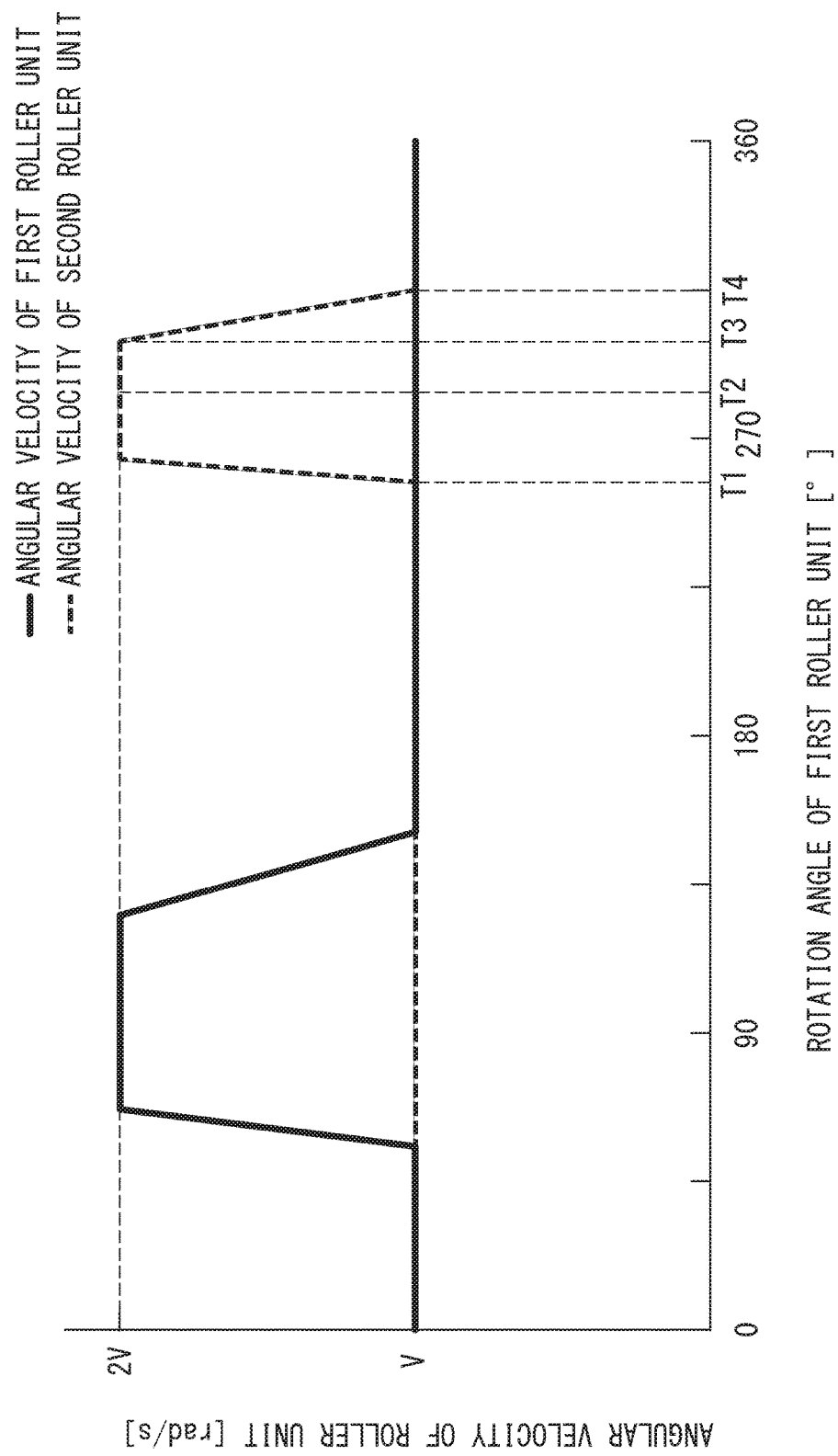
FIG. 19 is a graph showing angular velocities of the first roller unit and the second roller unit with respect to a rotation angle of the first roller unit.

FIG. 19 is a graph showing angular velocities (rad/s) of the first roller unit 10 and the second roller unit 20 with respect to a rotation angle (°) of the first roller unit 10. In this embodiment, the rotation angle of the first roller unit 10 means an angle around the axis line X1 by assuming respective positions shown in FIG. 7 as 0°, 90°, 180° and 270°.

The control unit 600 shown in FIG. 1 transmits a control signal to the tube pump 100 for controlling the first drive unit 50 and the second drive unit 60 such that the first roller unit 10 and the second roller unit 20 are rotated at angular velocities shown in FIG. 19 when the first roller unit 10 passes the separate position Po2.

Next, with reference to FIG. 19, there will be explained a method for controlling the tube pump 100 by the control unit 600 when the first roller unit 10 passes the separate position Po2. Hereinafter, the method for controlling the tube pump 100 when the first roller unit 10 passes the separate position Po2 is explained. A method for controlling the tube pump 100 when the second roller unit 20 passes the separate position Po2 is substantially equal to the method for controlling the tube pump 100 when the first roller unit 10 passes the separate position Po2. Accordingly, hereinafter, the explanation of the method for controlling the tube pump 100 when the second roller unit 20 passes the separate position Po2 is omitted.

As shown in FIG. 7, the separate position Po2 exists within a range where the rotation angle around the axis line X1 is more than 270° and less than 360° (0°). Hereinafter, an operation performed by the tube pump 100 during a period from a time T1 to time T4 shown in FIG. 19 will be explained. The time T1 corresponds to the state shown in FIG. 7 where the tube 101 is closed, and the time T2 corresponds to the state shown in FIG. 8 where the tube 101 starts to open. The time T3 corresponds to the state shown in FIG. 9 where the tube 101 is open, and the time T4 corresponds to the state shown in FIG. 10 where the first roller unit 10 reaches the separate position Po2.

At a point of time immediately before the time T1, the control unit 600 maintains both the first roller unit 10 and the second roller unit 20 at an angular velocity V. In this case, angular velocities of the first roller unit 10 and the second roller unit 20 are equal to each other and hence, a difference in rotation angle between the first roller unit 10 and the second roller unit 20 is maintained at a fixed value.

At the time T1, the control unit 600 increases the angular velocity of the second roller unit 20 from the angular velocity V to an angular velocity 2V which is twice the amount of the angular velocity V while maintaining an angular velocity of the first roller unit 10 at the angular velocity V. In this embodiment, the angular velocity of the second roller unit 20 is increased to the angular velocity 2V which is twice the amount of the angular velocity V. However, the angular velocity of the roller unit may be increased to an arbitrary angular velocity larger than the angular velocity V corresponding to characteristics of respective parts of the tube pump 100.

The control unit 600 increases the angular velocity of the second roller unit 20 from the time T1 in order to reduce an angular difference around the axis line X1 between the first roller unit 10 and the second roller unit 20.

As shown in FIG. 7 and FIG. 8, at the time T1 and the time T2, the tube 101 is brought into a state where portions of the tube 101 are compressed due to the contact of the first roller unit 10 and the second roller unit 20 thus being closed. Therefore, when an angular difference around the axis line X1 between the first roller unit 10 and the second roller unit 20 is reduced, an inner volume of the closed tube 101 is reduced so that a pressure of the liquid in the tube 101 is increased.

The control unit 600 controls the first drive unit 50 and the second drive unit 60 such that, at the time T2 at which the tube 101 starts to open, a pressure of a liquid in the tube 101 is increased to a second predetermined pressure Pr2 having a predetermined pressure difference with respect to the first predetermined pressure Pr1 which is a pressure of a liquid in the pipe 200.

In this embodiment, the predetermined pressure difference is desirably set to a value within 0.2 times that of the first predetermined pressure Pr1. That is, it is desirable that the second predetermined pressure Pr2 satisfies the following conditional expression (1).

$$0.8 Pr1 \leq Pr2 \leq 1.2 Pr1 \qquad (1)$$

The control unit 600 increases the pressure of the liquid in the tube 101 so as to allow the liquid to have the second predetermined pressure Pr2 which satisfies the conditional expression (1). With the increase of the pressure, when the tube 101 is brought into the state where the tube 101 starts to open, a difference in pressure of a liquid between the upstream side of the position at which the tube 101 starts to open and the downstream side of the position at which the tube 101 starts to open is reduced. Therefore, it is possible to suppress a drawback that a forward and reverse flow of a liquid is generated between the upstream side and the downstream side of the position at which the tube 101 starts to open thus generating pulsation.

The control unit 600 maintains the angular velocity V2 until the time T3 even after the time T2 at which the tube 101 starts to open. This is because, even after the time T2, a flow path cross sectional area of the tube 101 is increased until the time T3 at which the tube 101 is brought into an open state. The control unit 600 maintains the second roller unit 20 at a higher angular velocity than the first roller unit 10 so as to prevent the forward and reverse flow of a liquid between the upstream side and the downstream side of the position at which the tube 101 opens when the flow path cross sectional area of the tube 101 is increased.

After the time T3 is reached at which the tube 101 is brought into an open state, the control unit 600 reduces an angular velocity of the second roller unit 20 from the angular velocity V2 to the angular velocity V. After the time T4 is reached, the control unit 600 maintains the first roller unit 10 and the second roller unit 20 at the angular velocity V.

Next, a flow rate of a liquid controlled by the tube pump system 700 of this embodiment will be explained while compared with comparative examples.

Figure 20:
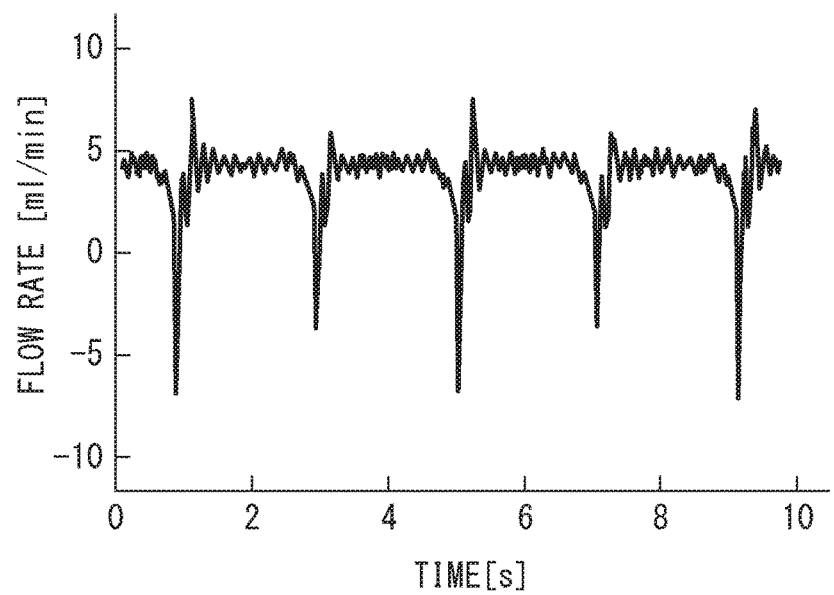
FIG. 20 is a graph showing a flow rate of a liquid measured by a flowmeter of a tube pump system of a first comparative example.
Figure 21:
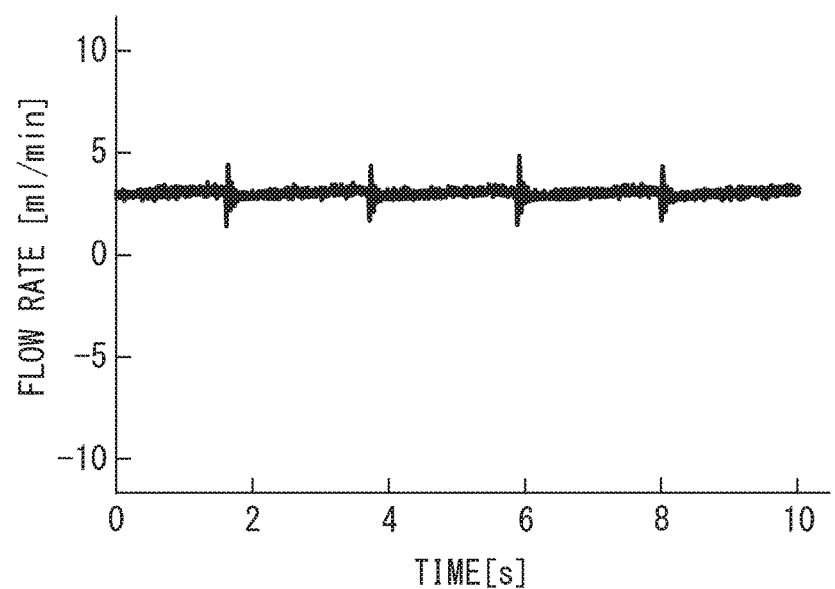
FIG. 21 is a graph showing a flow rate of a liquid measured by a flowmeter of a tube pump system of a second comparative example.
Figure 22:
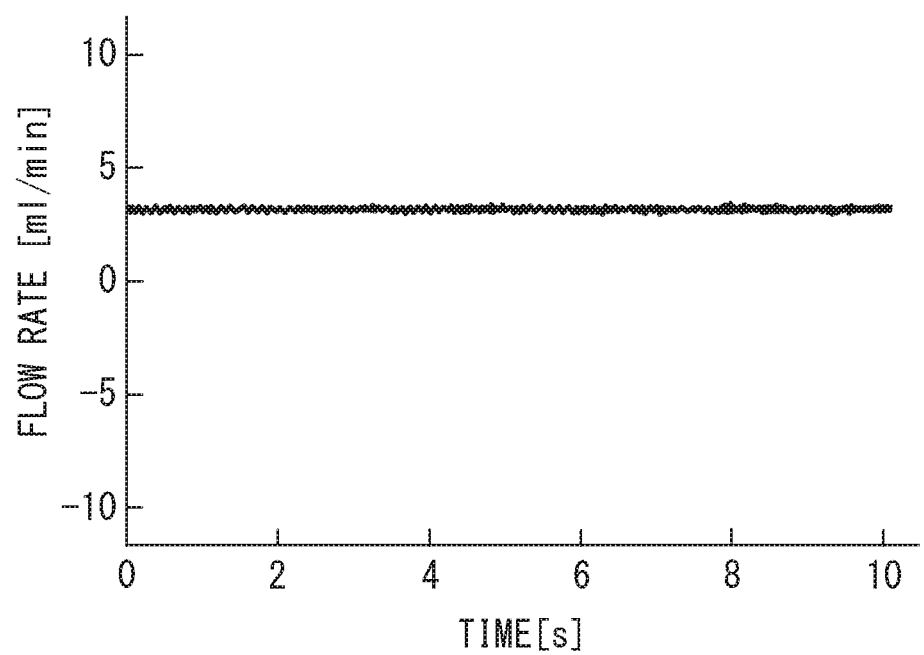
FIG. 22 is a graph showing a flow rate of a liquid measured by a flowmeter of the tube pump system of the first embodiment.

FIG. 20 is a graph showing a flow rate of a liquid measured by a flowmeter of a tube pump system of a first comparative example. FIG. 21 is a graph showing a flow rate of a liquid measured by a flowmeter of a tube pump system of a second comparative example. FIG. 22 is a graph showing a flow rate of a liquid measured by the flowmeter 400 of the tube pump system 700 of this embodiment.

The first comparative example is an example where the needle valve 500 is removed from the tube pump system 700 shown in FIG. 1. The first comparative example is also the example where the first roller unit 10 and the second roller unit 20 are respectively rotated at a constant velocity of a fixed angular velocity V.

In the first comparative example, the system is not provided with the needle valve 500 so that a pressure of a fluid flowing through the pipe 200 on the downstream side of the tube pump 100 agrees with an atmospheric pressure. Therefore, in the first comparative example, a first continuous pulsation having an amplitude of approximately 2 ml/min is generated.

Further, in the first comparative example, the first roller unit 10 and the second roller unit 20 are respectively rotated at the constant velocity of the fixed angular velocity V so that pulsation is generated when the first roller unit 10 and the second roller unit 20 pass the separate position Po2. In FIG. 20, second periodic pulsation having an amplitude of approximately 15 ml/min is generated at intervals of approximately 2 seconds.

The second comparative example is an example where the first roller unit 10 and the second roller unit 20 are respectively rotated at a constant velocity of a fixed angular velocity V.

In the second comparative example, the system is provided with the needle valve 500 so that the first pulsation having the amplitude of approximately 2 ml/min in the first comparative example is suppressed. This is because the pipe 200 where a liquid in the pipe 200 is maintained at a high static pressure is elastically deformed so that pulsation of the liquid is suppressed.

However, in the second comparative example, in the same manner as the first comparative example, the first roller unit 10 and the second roller unit 20 are respectively rotated at the constant velocity of the fixed angular velocity V so that the second pulsation is generated when the first roller unit 10 and the second roller unit 20 pass the separate position Po2. In FIG. 21, pulsation having an amplitude of approximately 3 ml/min is generated at intervals of approximately 2 seconds. Although the amplitude of the second pulsation in the second comparative example is suppressed compared to the amplitude of 15 ml in the first comparative example, the amplitude of the second pulsation is larger than the amplitude of the first pulsation.

On the other hand, in this embodiment, the system is provided with the needle valve 500 so that an amplitude of the first pulsation which is approximately 2 ml/min in the first comparative example is sufficiently suppressed. Further, when the roller unit passes the separate position Po2, an angular velocity of the following roller unit is increased with respect to an angular velocity of the preceding roller unit and hence, an amplitude of the second pulsation which is approximately 3 ml/min in the second comparative example is also sufficiently suppressed.

As described above, according to the tube pump system 700 of this embodiment, compared to the first comparative example and the second comparative example, both the continuously generated first pulsation and the periodically generated second pulsation can be sufficiently suppressed.

There will be explained actions and effects exerted by the tube pump system 700 of this embodiment explained above.

According to the tube pump system 700 of this embodiment, when one of the first roller unit 10 and the second roller unit 20 passes the separate position Po2, a pressure of the liquid in the tube 101 which is closed due to the contact of the first roller unit 10 and the second roller unit 20 is increased to the second predetermined pressure Pr2 having a predetermined pressure difference with respect to the first predetermined pressure Pr1. Therefore, when one of the first roller unit 10 and the second roller unit 20 passes the separate position Po2 and the tube 101 compressed by the first roller unit 10 or the second roller unit 20 returns to the original shape, a pressure difference between a pressure of the liquid on the downstream side of the separate position Po2 and a pressure of the liquid on the upstream side of the separate position Po2 is reduced thus conforming to a predetermined pressure difference. Accordingly, compared to a case where the pressure difference is larger than the predetermined pressure difference, it is possible to suppress the generation of pulsation of a liquid caused by the fluctuation of the flow rate of the liquid at the separate position Po2 when one of the first roller unit 10 and the second roller unit 20 passes the separate position Po2.

Further, the tube pump system 700 of this embodiment includes the flowmeter 400 which measures a flow rate of the liquid flowing through the inside of the pipe 200, and the control unit 600 controls each of the first drive unit 50 and the second drive unit 60 such that the flow rate of the liquid measured by the flowmeter 400 conforms to a target flow rate.

With such a configuration, it is possible to control each of the first drive unit 50 and the second drive unit 60 such that the flow rate of the liquid measured by the flowmeter 400 conforms to the target flow rate while the generation of pulsation of the liquid is suppressed.

In the tube pump system 700 of this embodiment, an opening degree of the needle valve 500 is desirably adjusted such that the first predetermined pressure Pr1 is equal to or more than 30 kPaG and equal to or less than 150 kPaG.

With such a configuration, the first predetermined pressure Pr1 of the liquid flowing through the pipe 200 becomes sufficiently higher than the atmospheric pressure and hence, further transmission of pulsation of the liquid to the downstream side of the pipe 200 can be suppressed.

Second Embodiment

Next, a tube pump system 700 according to a second embodiment of the present disclosure will be explained with reference to drawings.

The tube pump system 700 of this embodiment is substantially equal to the tube pump system 700 of the first embodiment except for points explained hereinafter. Accordingly, the repeated explanation is omitted hereinafter.

In the tube pump system 700 of the first embodiment, when the first roller unit 10 passes the separate position Po2, the preceding first roller unit 10 is maintained at the angular velocity V. On the other hand, in the tube pump system 700 of this embodiment, when the first roller unit 10 passes the separate position Po2, an angular velocity of the preceding first roller unit 10 is temporarily increased.

Figure 23:
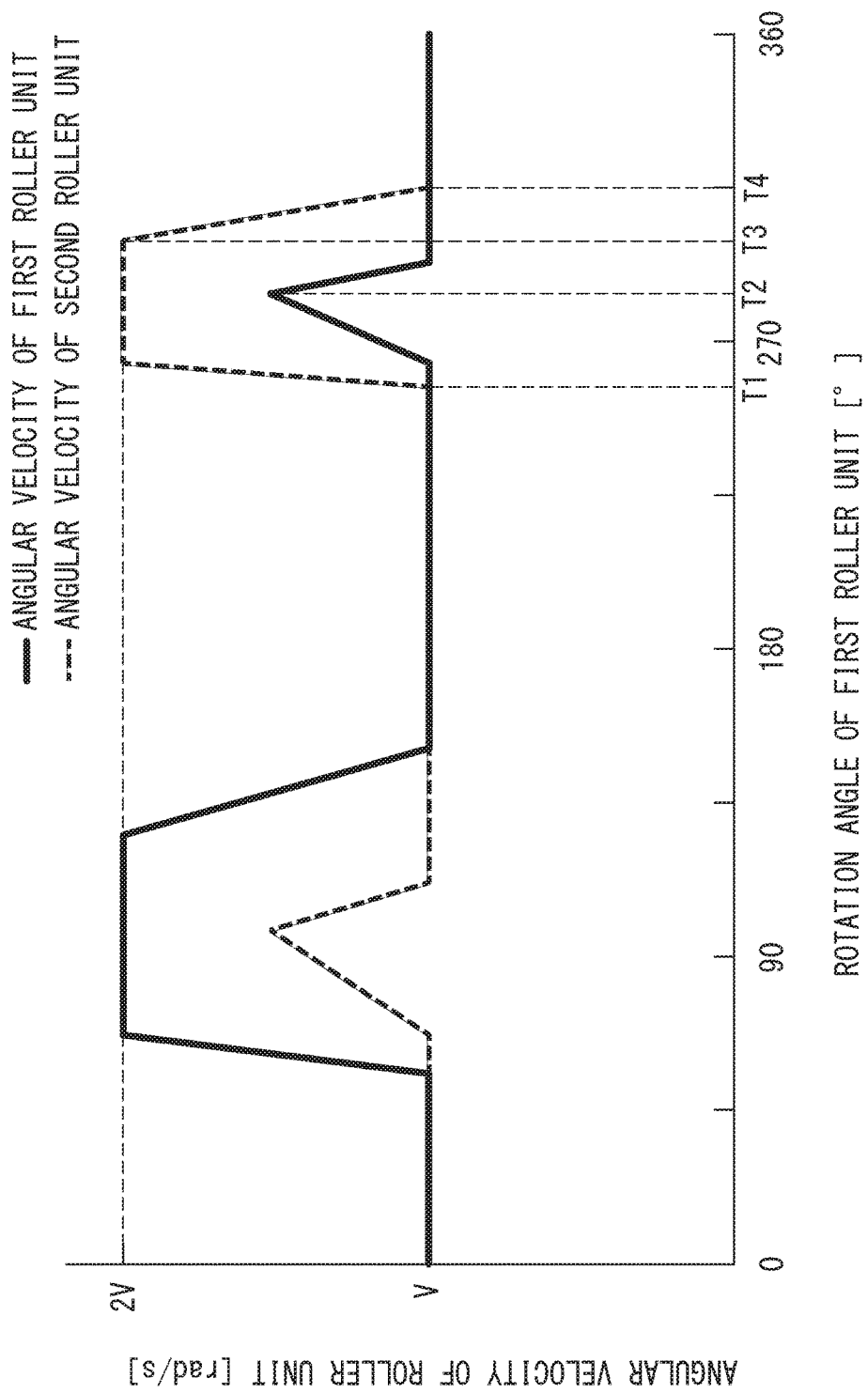
FIG. 23 is a graph showing angular velocities of the first roller unit and the second roller unit with respect to the rotation angle of the first roller unit.

With reference to FIG. 23, there will be explained a method for controlling the tube pump 100 by the control unit 600 when the first roller unit 10 passes the separate position Po2. Hereinafter, the method for controlling the tube pump 100 when the first roller unit 10 passes the separate position Po2 will be explained. The same goes for the method for controlling the tube pump 100 when the second roller unit 20 passes the separate position Po2. Accordingly, the repeated explanation is omitted hereinafter.

As shown in FIG. 7, the separate position Po2 exists within a range where the rotation angle around the axis line X1 is more than 270° and less than 360° (0°). Hereinafter, an operation performed by the tube pump 100 during a period from a time T1 to a time T4 shown in FIG. 23 will be explained. The time T1 corresponds to a state shown in FIG. 7 where the tube 101 is closed, and the time T2 corresponds to a state shown in FIG. 8 where the tube 101 starts to open. The time T3 corresponds to a state shown in FIG. 9 where the tube 101 is open, and the time T4 corresponds to a state shown in FIG. 10 where the first roller unit 10 reaches the separate position Po2.

After the time T1, the control unit 600 increases an angular velocity of the first roller unit 10 from an angular velocity V with a constant acceleration until the time T2. The time T2 corresponds to a state where the first roller unit 10 compresses the tube 101 is released so that the tube 101 starts to open. Accordingly, the control unit 600 temporarily increases an angular velocity of the first roller unit 10 when the state where the first roller unit 10 compresses the tube 101 is released.

With such a configuration, when the state where the first roller unit 10 compresses the tube 101 is released, the first roller unit 10 can temporarily increase a discharge force for discharging a liquid toward the downstream side of the separate position Po2.

The reason the above-mentioned configuration is adopted is as follows. When the tube 101 changes from a state shown in FIG. 15 where a flow path cross sectional area is zero to a state shown in FIG. 16 where the flow path cross sectional area is larger than zero, an inner volume of the tube 101 closed by the first roller unit 10 and the second roller unit 20 is gradually increased. Along with the increase of the inner volume of the tube 101, a flow rate of a liquid discharged from the tube pump 100 is reduced.

As described above, the first roller unit 10 temporarily increases the discharge force and hence, it is possible to suppress the generation of pulsation of the liquid which is caused by the reduction of the flow rate of the liquid discharged from the tube pump 100.

This embodiment is effectively applicable particularly to a case where the first predetermined pressure Pr1 which is a pressure of a liquid flowing through the inside of the pipe 200 is relatively low (for example, equal to or less than 90 kPa). When the first predetermined pressure Pr1 is relatively low, a change in pressure caused by the reduction of a flow rate of a liquid discharged from the tube pump 100 is relatively large with respect to the first predetermined pressure Pr1. In this embodiment, the angular velocity of the first roller unit 10 is temporarily increased when the state where the first roller unit 10 compresses the tube 101 is released so that pulsation of the liquid is suppressed.

Other Embodiments

In the above explanation, the tube pump system 700 is provided with the needle valve 500 having a minimum flow path cross sectional area in the path through which a liquid is introduced from the tube pump 100 to the outflow end 702. However, another aspect may be employed.

For example, an orifice or the like having a minimum flow path cross sectional area in the path through which a liquid is introduced from the tube pump 100 to the outflow end 702 may be provided in place of the needle valve 500.

In the above explanation, in the tube pump system 700, the control unit 600 controls the tube pump 100 such that a flow rate of a liquid measured by the flowmeter 400 conforms to a target flow rate. However, another aspect may be employed.

For example, an aspect where a flow rate measured by the flowmeter 400 is not controlled by the tube pump 100, or an aspect where the flowmeter 400 is not provided may be employed.

The invention claimed is:

1. A tube pump system comprising:
a housing unit which has an inner peripheral surface formed into a circular-arc shape around an axis line;
a tube having flexibility which is arranged along the inner peripheral surface;
a pair of roller units which are housed in the housing unit, and are rotated around the axis line from a contact position to a separate position around the axis line in a state where the pair of roller units compress the tube;
a pair of drive units which are configured to rotate the pair of roller units respectively around the axis line in a same direction; and
a control unit which is configured to control each of the pair of drive units such that a liquid which flows into the tube from one end of the tube is discharged from the other end of the tube, wherein
a pipe having flexibility is connected to the other end of the tube, the pipe maintaining a pressure of the liquid flowing through the inside of the pipe at a first predetermined pressure higher than an atmospheric pressure, and
the control unit is configured to control each of the pair of drive units such that a pressure of the liquid in the tube which is closed due to a contact of the pair of roller units is increased to a second predetermined pressure having a predetermined pressure difference with respect to the first predetermined pressure when one of the pair of roller units passes the separate position.

2. The tube pump system according to claim 1, wherein the control unit is configured to temporarily increase an angular velocity of said one of the pair of roller units when a state where said one of the pair of roller units compresses the tube is released.

3. The tube pump system according to claim 1, further comprising a flowmeter which is configured to measure a flow rate of the liquid flowing through the inside of the pipe, wherein
the control unit is configured to control each of the pair of drive units such that the flow rate of the liquid measured by the flowmeter conforms to a target flow rate.

4. The tube pump system according to claim 1, wherein the first predetermined pressure is equal to or more than 30 kPaG and equal to or less than 150 kPaG.

5. A method for controlling a tube pump system which includes a housing unit which has an inner peripheral surface formed into a circular-arc shape around an axis line; a tube having flexibility which is arranged along the inner peripheral surface; a pair of roller units which are housed in the housing unit, and are rotated around the axis line from a contact position to a separate position around the axis line in a state where the pair of roller units compress the tube; and a pair of drive units which are configured to rotate the pair of roller units respectively around the axis line in a same direction, the method comprising:
a controlling step of controlling each of the pair of drive units such that a liquid which flows into the tube from one end of the tube is discharged from the other end of the tube, wherein
a pipe having flexibility is connected to the other end of the tube, the pipe maintaining a pressure of the liquid flowing through the inside of the pipe at a first predetermined pressure higher than an atmospheric pressure, and in the controlling step, each of the pair of drive units is controlled such that a pressure of the liquid in the tube which is closed due to a contact of the pair of roller units is increased to a second predetermined pressure having a predetermined pressure difference with respect to the first predetermined pressure when one of the pair of roller units passes the separate position.

6. The method for controlling a tube pump system according to claim 5, wherein in the controlling step, an angular velocity of said one of the pair of roller units is temporarily increased when a state where said one of the pair of roller units compresses the tube is released.

7. The method for controlling a tube pump system according to claim 5, further comprising a measuring step of measuring a flow rate of the liquid flowing through the inside of the pipe, wherein in the controlling step, each of the pair of drive units is controlled such that the flow rate of the liquid measured in the measuring step conforms to a target flow rate.

8. The method for controlling a tube pump system according to claim 5, wherein the first predetermined pressure is equal to or more than 30 kPaG and equal to or less than 150 kPaG.

\* \* \* \* \*